(12) United States Patent
Xu et al.

(10) Patent No.: US 11,445,489 B2
(45) Date of Patent: Sep. 13, 2022

(54) TECHNIQUES FOR DOWNLINK CONTROL CHANNEL LOCATION INDICATION IN WIRELESS COMMUNICATIONS

(71) Applicant: Qualcomm Incorporated, San Diego, CA (US)

(72) Inventors: Changlong Xu, Beijing (CN); Kai Chen, Shenzhen (CN); Hao Xu, Beijing (CN); Jing Jiang, San Diego, CA (US); Jing Sun, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/772,656

(22) PCT Filed: Nov. 14, 2018

(86) PCT No.: PCT/CN2018/115366
§ 371 (c)(1),
(2) Date: Jun. 12, 2020

(87) PCT Pub. No.: WO2019/114482
PCT Pub. Date: Jun. 20, 2019

(65) Prior Publication Data
US 2021/0022120 A1     Jan. 21, 2021

(30) Foreign Application Priority Data
Nov. 14, 2018 (WO) ................ PCT/CN2018/115366

(51) Int. Cl.
*H04W 72/04* (2009.01)
*H04L 5/00* (2006.01)

(52) U.S. Cl.
CPC ......... *H04W 72/042* (2013.01); *H04L 5/0053* (2013.01)

(58) Field of Classification Search
CPC ............ H04W 72/042; H04W 72/0446; H04L 5/0053; H04L 5/0044; H04L 5/0094
See application file for complete search history.

(56) References Cited

U.S. PATENT DOCUMENTS

2015/0092563 A1    4/2015  Tabet et al.
2016/0218847 A1*   7/2016  Zheng ................. H04W 68/025
(Continued)

FOREIGN PATENT DOCUMENTS

CN         102625456 A      8/2012
CN         103052160 A      4/2013
(Continued)

OTHER PUBLICATIONS

International Search Report and Written Opinion—PCT/CN2018/115366—ISA/EPO—dated Feb. 12, 2019 (180922WO2).
(Continued)

*Primary Examiner* — Diane L Lo
*Assistant Examiner* — Abusayeed M Haque
(74) *Attorney, Agent, or Firm* — Holland & Hart LLP

(57) ABSTRACT

Methods, systems, and devices for wireless communications are described that provide for a location indicator transmission that may indicate a location of control channel resources that are to be monitored by a user equipment (UE) for control channel transmissions. A UE may receive the location indicator, and monitor the indicated control channel resources to receive downlink control information with an allocation of shared channel resources for the UE. The location indicator may include one or more parameters that allow a UE to receive the control channel transmissions according to a single decoding hypothesis. The location indicator may include one or more of a valid period of the location of the control channel transmissions, an interval at which control channel transmissions may be transmitted, an
(Continued)

aggregation level used for the control channel transmissions, an index that identifies a first control channel element of the control channel transmissions, or combinations thereof.

28 Claims, 18 Drawing Sheets

(56) References Cited

U.S. PATENT DOCUMENTS

| | | | | |
|---|---|---|---|---|
| 2016/0234804 A1* | 8/2016 | Hu | ............ | H04W 68/02 |
| 2017/0135127 A1 | 5/2017 | Nogami et al. | | |
| 2017/0332386 A1 | 11/2017 | Li et al. | | |
| 2018/0077689 A1* | 3/2018 | Rico Alvarino | ...... | H04L 5/0042 |
| 2019/0356546 A1* | 11/2019 | Zhang | ............ | H04L 1/1812 |
| 2020/0228284 A1* | 7/2020 | Chmiel | ............ | H04W 16/14 |
| 2020/0266963 A1* | 8/2020 | Song | ............ | H04W 72/042 |
| 2021/0184909 A1* | 6/2021 | Han | ............ | H04W 88/04 |
| 2021/0204282 A1* | 7/2021 | Lee | ............ | H04L 5/0053 |

FOREIGN PATENT DOCUMENTS

| | | |
|---|---|---|
| CN | 103124399 A | 5/2013 |
| CN | 103959682 A | 7/2014 |
| CN | 106686740 A | 5/2017 |
| EP | 2797352 A1 | 10/2014 |
| WO | WO-2017020199 A1 | 2/2017 |

OTHER PUBLICATIONS

International Search Report and Written Opinion—PCT/CN2017/115925—ISA/EPO—dated Aug. 29, 2018 (180922WO1).
Supplementary European Search Report—EP18888181—Search Authority—The Hague—dated Jul. 14, 2021 (180922EP).

* cited by examiner

TECHNIQUES FOR DOWNLINK CONTROL CHANNEL LOCATION INDICATION IN WIRELESS COMMUNICATIONS

CROSS REFERENCES

The present Application is a 371 national phase filing of International Patent Application No. PCT/CN2018/115366 by XU et. al., entitled "TECHNIQUES FOR DOWNLINK CONTROL CHANNEL LOCATION INDICATION IN WIRELESS COMMUNICATIONS," filed Nov. 14, 2018; and to International Patent Application No. PCT/CN2017/115925 by XU et. al., entitled "TECHNIQUES FOR DOWNLINK CONTROL CHANNEL LOCATION INDICATION IN WIRELESS COMMUNICATIONS," filed Dec. 13, 2017, each of which is assigned to the assignee hereof which is hereby incorporated by reference in their entirety.

BACKGROUND

The following relates generally to wireless communication, and more specifically to techniques for downlink control channel location indication in wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Base stations and UEs in wireless multiple-access communications systems may allocate wireless resources to different UEs, which may be used for subsequent wireless transmissions. In some cases, base stations may transmit an indication of allocated wireless resources to a UE in control channel transmissions that may include downlink control information with an indication of allocated resources. A UE may monitor for the control channel transmissions, decode the downlink control information, and determine wireless resources that are allocated to the UE for data or shared channel transmissions. In some cases, a UE may monitor control channel resources by blindly decoding potential control channel transmissions according to a set of decoding hypotheses and determine that a certain control channel transmission applies to the UE based on successfully decoding a transmission. In some cases it may be desirable to reduce the number of blind decodes that a UE is to perform, which may enhance reliability, reduce latency, and reduce power consumption at a UE.

SUMMARY

The described techniques relate to improved methods, systems, devices, or apparatuses that support techniques for downlink control channel location indication in wireless communications. Generally, the described techniques provide for a location indicator transmission that may provide a location of control channel resources that are to be monitored by a user equipment (UE) for control channel transmissions. A UE may receive the location indicator, and monitor the indicated control channel resources to receive downlink control information with an allocation of shared channel resources for the UE. In some cases, the location indicator may include one or more parameters that allow a UE to receive the control channel transmissions according to a single decoding hypothesis, which may enhance efficiency at the UE. In some cases, the location indicator may be provided to the UE in a physical location indicator channel (PLICH) transmission. In some cases, the location indicator may include one or more of a valid period of the location of the control channel transmissions, an interval at which control channel transmissions may be transmitted, an aggregation level used for the control channel transmissions, an index that identifies a first control channel element of the control channel transmissions, or any combination thereof.

A method of wireless communication is described. The method may include receiving, at a UE from a base station, a location indicator transmission having a location indicator that identifies downlink control channel resources that are to be monitored by the UE for downlink control information transmissions, monitoring the downlink control channel resources based at least in part on the received location indicator, receiving downlink control channel information on the downlink control channel resources based at least in part on the monitoring, identifying, based at least in part on the downlink control channel information, downlink shared channel resources that have been allocated for shared channel transmissions to the UE, and receiving the shared channel transmissions via the downlink shared channel resources.

An apparatus for wireless communication is described. The apparatus may include means for receiving, at a UE from a base station, a location indicator transmission having a location indicator that identifies downlink control channel resources that are to be monitored by the UE for downlink control information transmissions, means for monitoring the downlink control channel resources based at least in part on the received location indicator, means for receiving downlink control channel information on the downlink control channel resources based at least in part on the monitoring, means for identifying, based at least in part on the downlink control channel information, downlink shared channel resources that have been allocated for shared channel transmissions to the UE, and means for receiving the shared channel transmissions via the downlink shared channel resources.

Another apparatus for wireless communication is described. The apparatus may include a processor, memory in electronic communication with the processor, and instructions stored in the memory. The instructions may be operable to cause the processor to receive, at a UE from a base station, a location indicator transmission having a location indicator that identifies downlink control channel resources that are to be monitored by the UE for downlink control information transmissions, monitor the downlink control channel resources based at least in part on the received location indicator, receive downlink control channel information on the downlink control channel resources based at least in part on the monitoring, identify, based at least in part on the downlink control channel information, downlink shared channel resources that have been allocated for shared channel transmissions to the UE, and receive the shared channel transmissions via the downlink shared channel resources.

A non-transitory computer-readable medium for wireless communication is described. The non-transitory computer-readable medium may include instructions operable to cause a processor to receive, at a UE from a base station, a location indicator transmission having a location indicator that identifies downlink control channel resources that are to be monitored by the UE for downlink control information transmissions, monitor the downlink control channel resources based at least in part on the received location indicator, receive downlink control channel information on the downlink control channel resources based at least in part on the monitoring, identify, based at least in part on the downlink control channel information, downlink shared channel resources that have been allocated for shared channel transmissions to the UE, and receive the shared channel transmissions via the downlink shared channel resources.

In some examples of the method, apparatus, and non-transitory computer-readable medium described above, the receiving the location indicator transmission comprises receiving a physical location indicator channel (PLICH) transmission that includes the location indicator. In some examples of the method, apparatus, and non-transitory computer-readable medium described above, the PLICH transmission and a first instance of the downlink control channel resources to be monitored are in a same radio frame.

In some examples of the method, apparatus, and non-transitory computer-readable medium described above, the location indicator includes one or more of a valid period for the location indicator, an interval at which the downlink control channel resources may be to be monitored, an aggregation level of the downlink control information transmitted using the downlink control channel resources, an index of a first control channel element of the downlink control channel resources, or any combination thereof. In some examples of the method, apparatus, and non-transitory computer-readable medium described above, the valid period corresponds to a number of radio frame intervals during which the UE may be to monitor the identified downlink control channel resources, and wherein the UE monitors for a second PLICH transmission responsive to an expiration of the valid period.

Some examples of the method, apparatus, and non-transitory computer-readable medium described above may further include processes, features, means, or instructions for identifying a search space of downlink transmission resources that may be configured for transmission of the location indicator transmission. Some examples of the method, apparatus, and non-transitory computer-readable medium described above may further include processes, features, means, or instructions for searching the search space for the location indicator transmission. Some examples of the method, apparatus, and non-transitory computer-readable medium described above may further include processes, features, means, or instructions for decoding the location indicator transmission responsive to the searching. In some examples of the method, apparatus, and non-transitory computer-readable medium described above, the search space includes a common search space for multiple UEs and a UE-specific search space. In some examples of the method, apparatus, and non-transitory computer-readable medium described above, the searching comprises blindly decoding a plurality of decoding hypotheses within the search space.

In some examples of the method, apparatus, and non-transitory computer-readable medium described above, the shared channel transmissions may be transmissions of a first service that have a lower latency than a second service, and wherein the search space corresponds to a subset of a control channel search space associated with the second service. In some examples of the method, apparatus, and non-transitory computer-readable medium described above, the first service may be an ultra-reliable low latency (URLLC) service and the second service may be an enhanced mobile broadband (eMBB) service. In some examples of the method, apparatus, and non-transitory computer-readable medium described above, a coding rate of the location indicator transmission may be lower than a coding rate of control channel transmissions of the second service that may be transmitted in the control channel search space associated with the second service.

A method of wireless communication is described. The method may include transmitting a location indicator transmission to a UE, the location indicator transmission including a location indicator that identifies downlink control channel resources that are to be monitored by the UE for downlink control information transmissions, transmitting downlink control channel information to the UE using the identified downlink control channel resources, the downlink control channel information indicating downlink shared channel resources that have been allocated for shared channel transmissions to the UE, and transmitting the shared channel transmissions to the via the downlink shared channel resources.

An apparatus for wireless communication is described. The apparatus may include means for transmitting a location indicator transmission to a UE, the location indicator transmission including a location indicator that identifies downlink control channel resources that are to be monitored by the UE for downlink control information transmissions, means for transmitting downlink control channel information to the UE using the identified downlink control channel resources, the downlink control channel information indicating downlink shared channel resources that have been allocated for shared channel transmissions to the UE, and means for transmitting the shared channel transmissions to the via the downlink shared channel resources.

Another apparatus for wireless communication is described. The apparatus may include a processor, memory in electronic communication with the processor, and instructions stored in the memory. The instructions may be operable to cause the processor to transmit a location indicator transmission to a UE, the location indicator transmission including a location indicator that identifies downlink control channel resources that are to be monitored by the UE for downlink control information transmissions, transmit downlink control channel information to the UE using the identified downlink control channel resources, the downlink control channel information indicating downlink shared channel resources that have been allocated for shared channel transmissions to the UE, and transmit the shared channel transmissions to the via the downlink shared channel resources.

A non-transitory computer-readable medium for wireless communication is described. The non-transitory computer-readable medium may include instructions operable to cause a processor to transmit a location indicator transmission to a UE, the location indicator transmission including a location indicator that identifies downlink control channel resources that are to be monitored by the UE for downlink control information transmissions, transmit downlink control channel information to the UE using the identified downlink control channel resources, the downlink control channel information indicating downlink shared channel resources that have been allocated for shared channel transmissions to the UE, and transmit the shared channel transmissions to the via the downlink shared channel resources.

In some examples of the method, apparatus, and non-transitory computer-readable medium described above, the transmitting the location indicator transmission comprises transmitting a PLICH transmission that includes the location indicator. In some examples of the method, apparatus, and non-transitory computer-readable medium described above, the PLICH transmission and a first instance of the downlink control channel resources that may be to be monitored may be in a same radio frame.

In some examples of the method, apparatus, and non-transitory computer-readable medium described above, the location indicator includes one or more of a valid period for the location indicator, an interval at which the downlink control channel resources may be to be monitored by the UE, an aggregation level of the downlink control information transmitted using the downlink control channel resources, an index of a first control channel element of the downlink control channel resources, or any combination thereof. In some examples of the method, apparatus, and non-transitory computer-readable medium described above, the valid period corresponds to a number of radio frame intervals during which the UE may be to monitor the identified downlink control channel resources, and wherein the UE monitors for a second PLICH transmission responsive to an expiration of the valid period.

Some examples of the method, apparatus, and non-transitory computer-readable medium described above may further include processes, features, means, or instructions for establishing a connection with the UE and configuring a search space of downlink transmission resources for transmission of the location indicator transmission. In some examples of the method, apparatus, and non-transitory computer-readable medium described above, the search space includes a common search space for multiple UEs and a UE-specific search space.

In some examples of the method, apparatus, and non-transitory computer-readable medium described above, the shared channel transmissions may be transmissions of a first service that may have a lower latency than a second service, and wherein the search space corresponds to a subset of a control channel search space associated with the second service. In some examples of the method, apparatus, and non-transitory computer-readable medium described above, the first service may be an URLLC service and the second service may be an eMBB service.

In some examples of the method, apparatus, and non-transitory computer-readable medium described above, a coding rate of the location indicator transmission may be lower than a coding rate of control channel transmissions of the second service that may be transmitted in the control channel search space associated with the second service.

DETAILED DESCRIPTION

Figure 1:
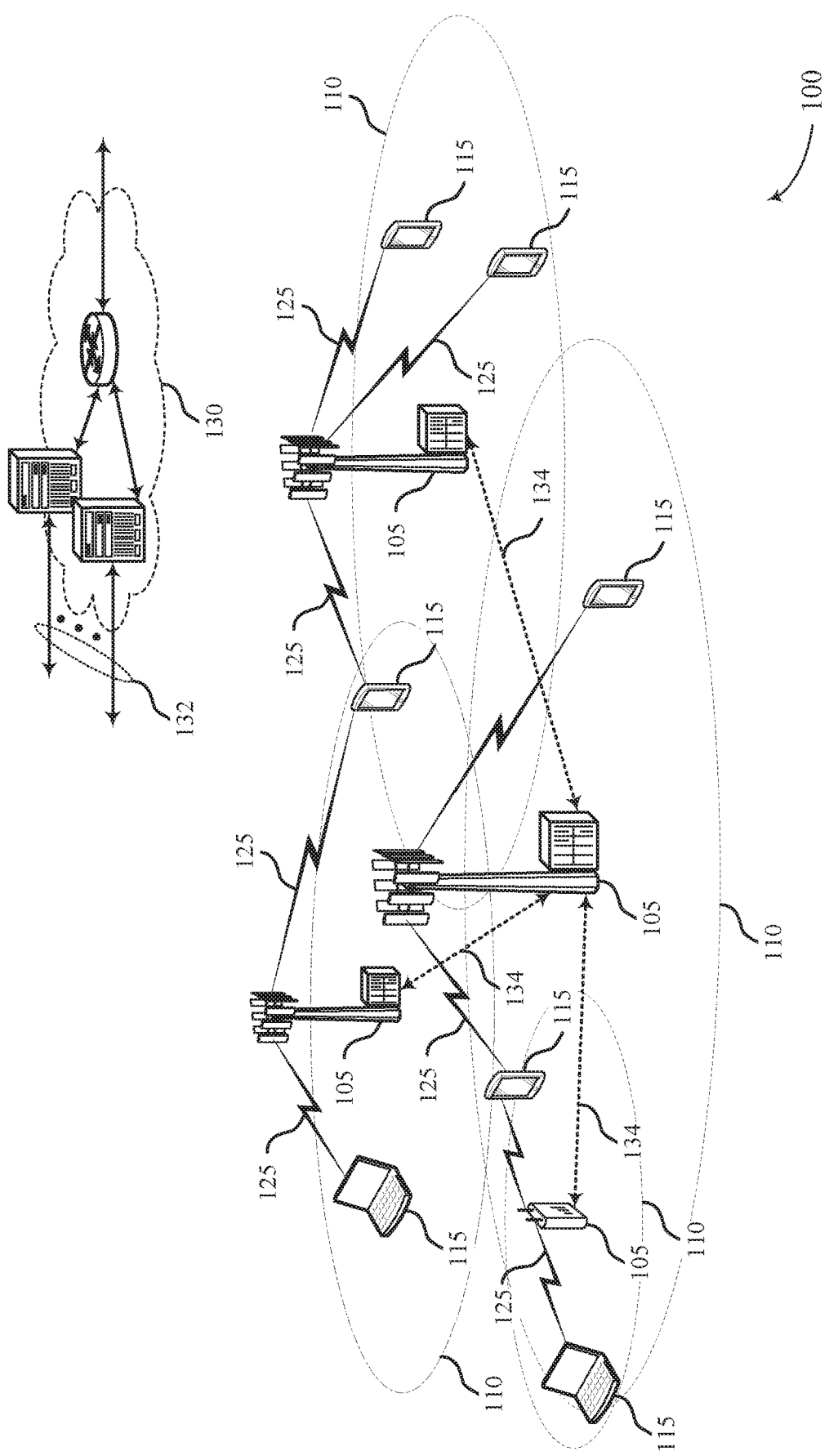
FIG. 1 illustrates an example of a system for wireless communication that supports techniques for downlink control channel location indication in wireless communications in accordance with aspects of the present disclosure.

Various aspects of the present disclosure provide for transmission of a location indicator that may provide a location of control channel resources that are to be monitored by a user equipment (UE) for control channel transmissions. A UE may receive the location indicator, and monitor the indicated control channel resources to receive downlink control information with an allocation of shared channel resources for the UE. In some cases, the location indicator may be provided for control channel transmissions of a relatively low latency service that may allow the UE to decode the control channel transmissions for the low latency service using a single decoding hypothesis. In some cases, the UE may also be configured to transmit and receive transmissions of a relatively higher latency service, and control channel transmissions for the higher latency service may use multiple decoding hypotheses at the UE. In some cases, the lower latency service may be an ultra-reliable low latency communications (URLLC) service and the higher latency service may be an enhanced mobile broadband (eMBB) service.

In cases where relatively lower latency services (e.g., URLLC services) are used for communications, UEs and base stations may have relatively stringent block error rate (BLER) target, and well as a relatively short latency between a time of reception of a transmission and feedback indicating successful or unsuccessful reception of the transmission. For example, in some cases, URLLC communications may have a BLER target of less than or equal to $10^{-5}$, and a latency target of 0.5 ms for both uplink transmissions and downlink transmissions. In cases where relatively higher latency services (e.g., eMBB services) are used for communications, more relaxed BLER and latency targets may be used. Such BLER and latency targets may apply to both shared channel transmission and control channel transmissions. In cases where a UE may perform blind decoding for control channel transmissions, a relatively large number of blind decode hypotheses may consume processing resources at the UE and in some cases a UE may not be able to perform the processing within timelines to achieve latency targets of low latency communications.

For example, an eMBB service, similarly as legacy long term evolution (LTE) communications, may provide a control channel search space that a UE may search by performing blind decodes using up to 44 potential blind decoding hypotheses. As mentioned such blind decodes consume processing resources, consume power, and require time for a UE to complete. Furthermore, a false alarm rate (FAR) of blind decoding may be high enough that reliability targets of lower latency communications may not be met.

The location indication provided according to various aspects of the present disclosure may allow for relatively lower latency service control channel transmissions that may be decoded at a UE with reduced latency and higher reliability. In some cases, the location indicator may be provided to the UE in a physical location indicator channel (PLICH) transmission, and the UE may perform a reduced amount of blind decoding within a limited location indicator search space. In some cases, the location indicator may include one or more of a valid period of the location of the control channel transmissions, an interval at which control channel transmissions may be transmitted, an aggregation level used for the control channel transmissions, an index that identifies a first control channel element of the control channel transmissions, or any combination thereof. Such parameters may allow a UE to use a single decoding hypothesis, thus providing latency and complexity reduction, FAR reduction, and power savings that result from reduced processing resources consumed by blind decodes and from monitoring only resources that are indicated to include control channel transmissions. In some cases, the location indicator may also support a relatively large list size for CRC-aided successive cancellation list (CA-SCL) decoding without FAR increasing, by the reduction of times for blind detection.

Aspects of the disclosure are initially described in the context of a wireless communications system. Various examples of wireless resources having associated location and control channel resources are also described. Aspects of the disclosure are further illustrated by and described with reference to apparatus diagrams, system diagrams, and flowcharts that relate to techniques for downlink control channel location indication in wireless communications.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical or URLLC) communications, low latency communications, or communications with low-cost and low-complexity devices. In some cases, UEs 115 and base stations 105 may support two or more services, such as a URLLC service and an eMBB service, and one or more services may use a location indicator transmission to provide a location of associated control channel transmissions.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHmultiplez industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

As indicated above, control channel transmissions (e.g., physical downlink control channel (PDCCH) transmissions) may include downlink control information (DCI) that may include an allocation of shared channel resources (e.g., physical downlink shared channel (PDSCH) resources) that are allocated for downlink data transmissions to a UE 115. In various aspects of the present disclosure, a base station 105 may configure location indicator transmissions that may be transmitted to a UE 115 to provide an indication of a location of control channel transmissions. A UE 115 may receive the location indicator, and monitor the indicated control channel resources to receive downlink control information. In some cases, the location indicator may allow the UE 115 to decode the control channel transmissions using a single decoding hypothesis. In some cases, the location indicator may be provided to the UE 115 in a PLICH transmission, and the UE 115 may perform a reduced amount of blind decoding within a limited location indicator search space. In some cases, the location indicator may include one or more of a valid period of the location of the control channel transmissions, an interval at which control channel transmissions may be transmitted, an aggregation level used for the control channel transmissions, an index that identifies a first control channel element of the control channel transmissions, or any combination thereof.

Figure 2:
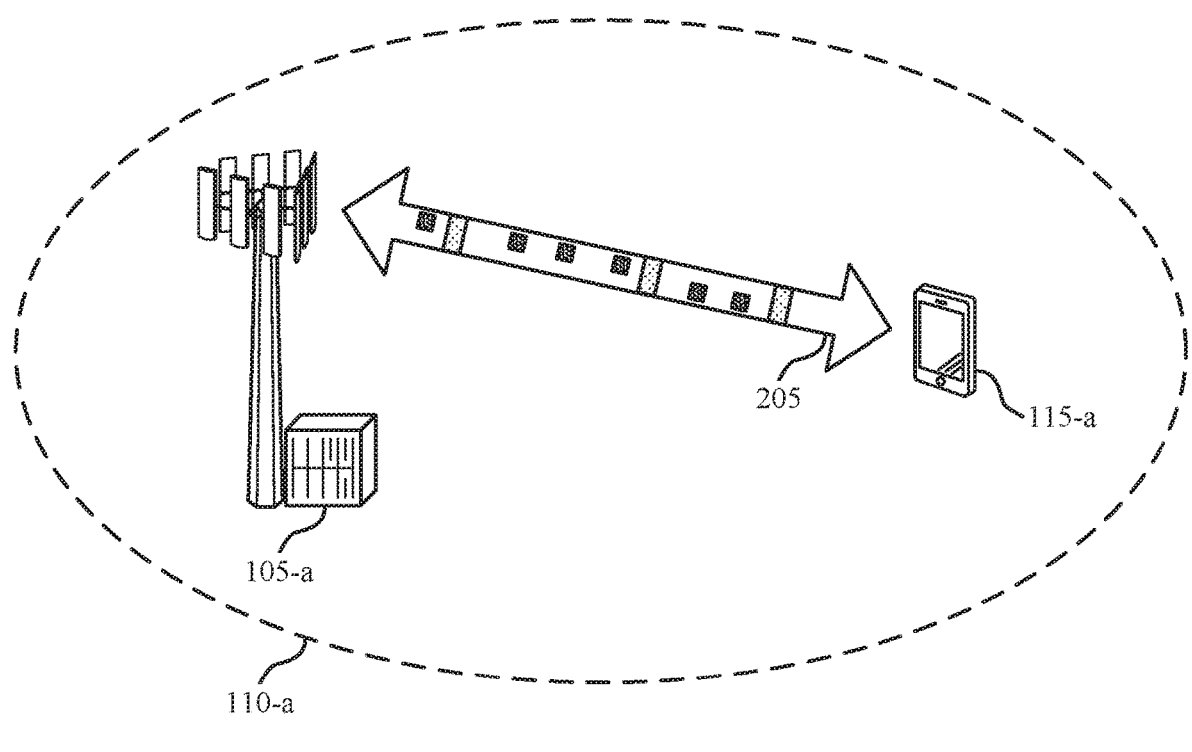
FIG. 2 illustrates an example of a portion of a wireless communication system that supports techniques for downlink control channel location indication in wireless communications in accordance with aspects of the present disclosure.

FIG. 2 illustrates an example of a portion of a wireless communication system 200 that supports techniques for downlink control channel location indication in wireless communications in accordance with various aspects of the present disclosure. In some examples, wireless communication system 200 may implement aspects of wireless communication system 100. In the example of FIG. 2, the wireless communication system 200 may include a base station 105-a, which may be an example of a base station 105 of FIG. 1. The wireless communication system 200 may also include a UE 115-*a*, which may be an example of a UE 115 of FIG. 1, that is located within coverage area 110-*a* of the base station 105-*a*.

In the example of FIG. 2, the base station 105-*a* and the UE 115-*a* may establish a connection 205. In some cases, the connection 205 may support transmissions of a low latency service, such as a URLLC service. In some cases, the connection 205 may support transmissions to two or more services, such as a low latency URLLC service and a higher latency eMBB service. In some cases, the base station 105-*a* may configure location indicator transmissions that may be used to provide the UE 115-*a* with location information for control channel transmissions that are to be monitored by the UE 115-*a*. In some cases, the location information may be transmitted using PLICH transmissions 210 that may be configured by the base station 105-*a*. The PLICH transmissions 210 may include information that the UE 115-*a* may use to monitor and decode PDCCH transmissions 215.

Figure 3:
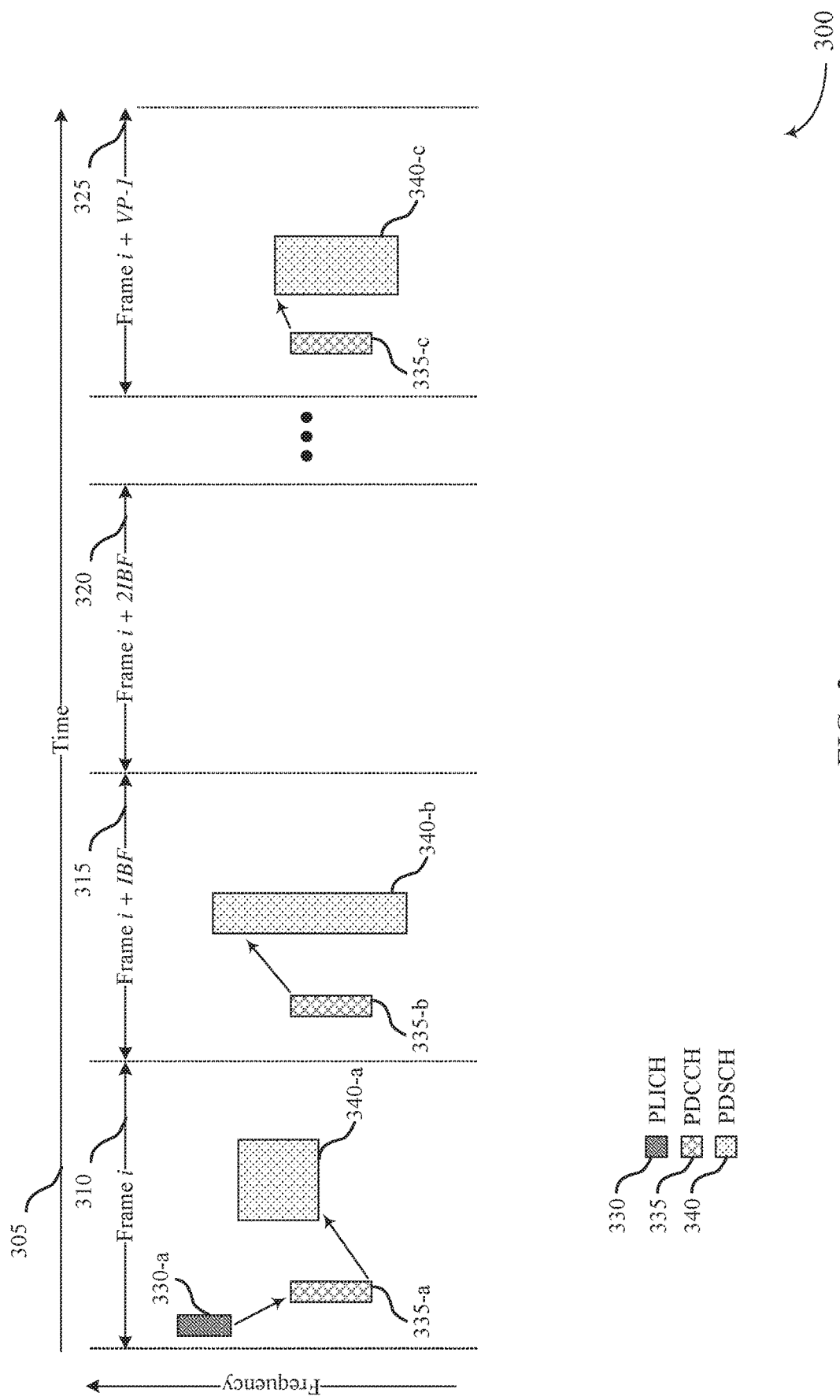
FIG. 3 illustrates an example of wireless resources that support techniques for downlink control channel location indication in wireless communications in accordance with aspects of the present disclosure.
Figure 4:
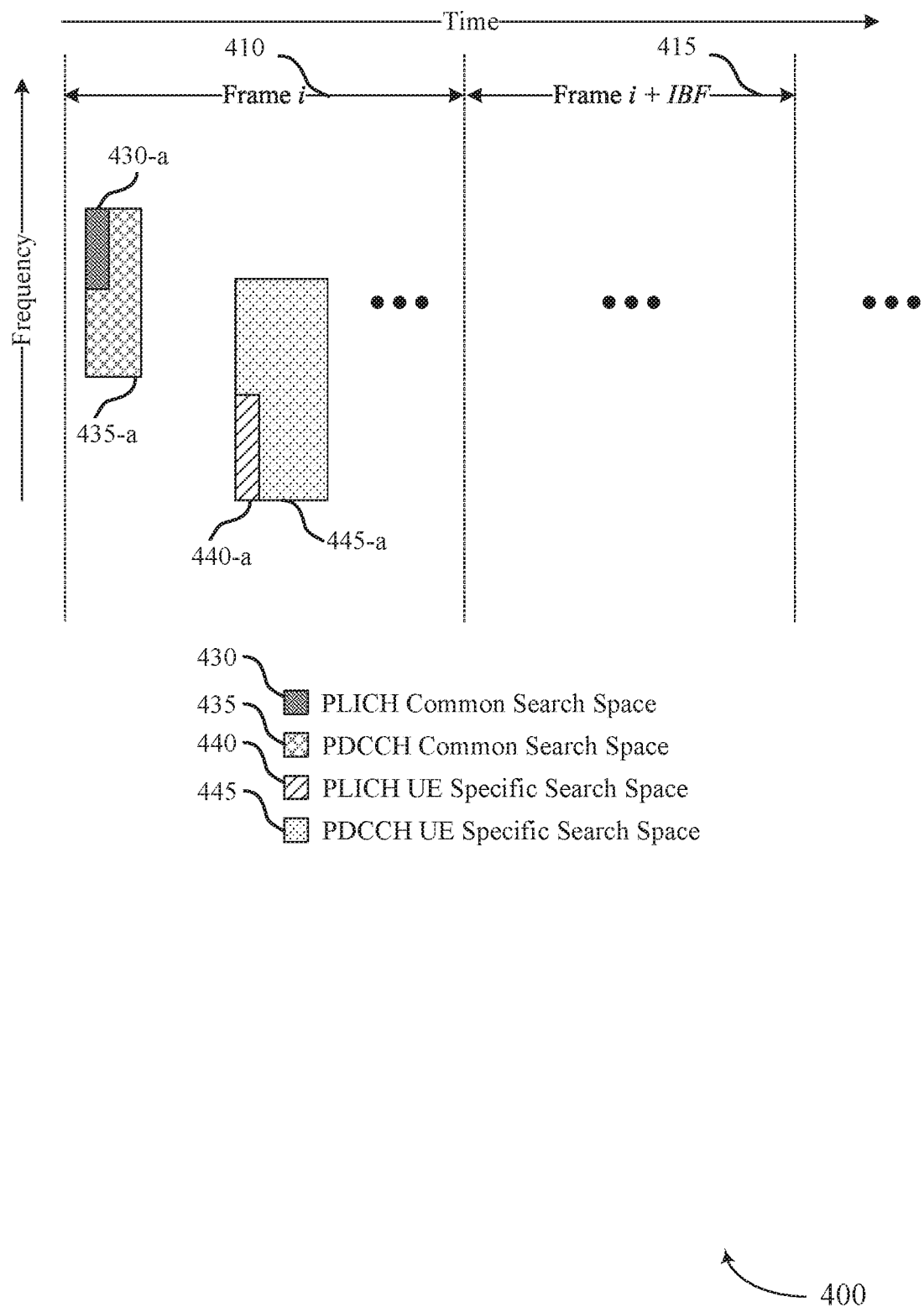
FIG. 4 illustrates an example of location indicator search spaces that support techniques for downlink control channel location indication in wireless communications in accordance with aspects of the present disclosure.
Figure 5:
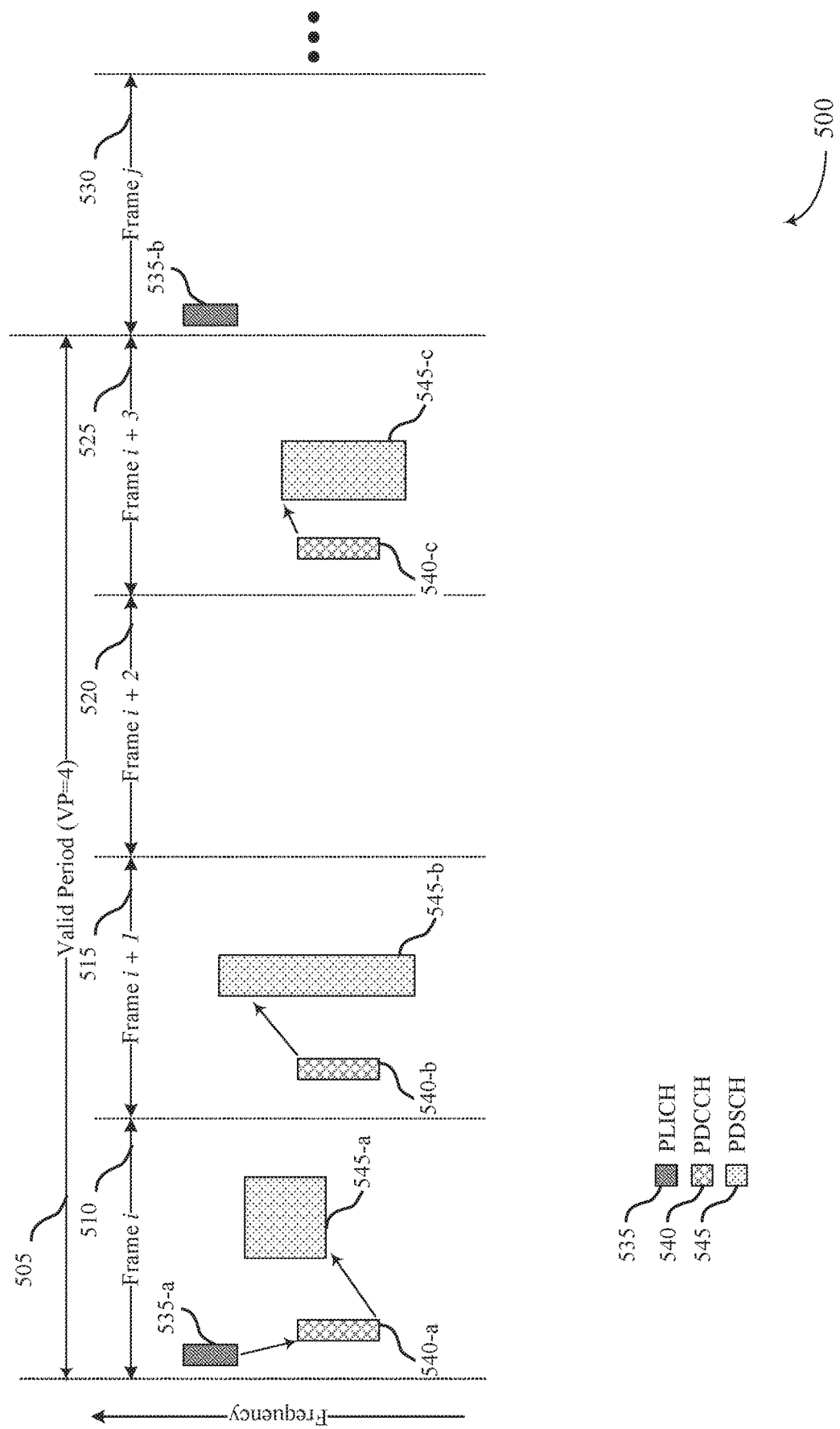
FIG. 5 illustrates an example of wireless resources that support techniques for downlink control channel location indication in wireless communications in accordance with aspects of the present disclosure.

According to various techniques provided herein, the UE 115-*a* may receive the PLICH transmissions 210, and monitor the indicated PDCCH resources for PDCCH transmissions 215 to receive downlink control information with an allocation of shared channel resources for the UE. In some cases, the PLICH transmissions 210 may allow the UE 115-*a* to decode the PDCCH transmissions 215 using a single decoding hypothesis. In some cases, the base station 105-*a* may configure PLICH transmissions 210 for a low latency service, and control channel transmissions for a higher latency service may be decoded at the UE 115-*a* according to techniques for blind decoding as discussed above. In some cases, the PLICH transmissions 210 may include one or more parameters that the UE 115-*a* may use to determine locations for PDCCH transmissions 215, such as a valid period (VP) of the location of the control channel transmissions, an interval between frames (IBF) that may indicate particular radio frames, slots, or TTIs that may include PDCCH transmissions 215, an aggregation level (AL) used for the PDCCH transmissions 215, an index of a first control channel element (IFC) that identifies a first control channel element (CCE) of the PDCCH transmissions 215. Such parameters may allow the UE 115-*a* to use a single decoding hypothesis for the PDCCH transmissions 215, thus providing latency and complexity reduction, FAR reduction, and power savings that result from reduced processing resources consumed by blind decodes and from monitoring only resources that are indicated to include control channel transmissions. In some cases, the PLICH transmissions 210 may also support a relatively large list size for CA-SCL decoding without an increase in FAR, through the reduction of times for blind detection. FIGS. 3 through 5 provide some examples of resources that may be used for PLICH transmissions 210, PDCCH transmissions 215, and associated PDSCH transmissions.

FIG. 3 illustrates an example of wireless resources 300 that support techniques for downlink control channel location indication in wireless communications in accordance with various aspects of the present disclosure. In some examples, wireless resources 300 may be used to implement aspects of wireless communication system 100 or 200. In the example of FIG. 3, a time period 305 corresponding to a valid period (VP) of a PLICH transmission includes a number of frames, namely a first frame 310, a second frame 315, a third frame 320, and a last frame 325 of the VP.

In the example of FIG. 3, the first frame 310 includes a PLICH transmission 330-*a* that a UE (e.g., a UE 115 of FIG. 1 or 2) may use to determine a location of subsequent PDCCH transmissions 335. In some examples, as indicated above, the PLICH transmission 330-*a* may include a number of parameters that a UE may use to form a single decoding hypothesis for subsequent PDCCH transmissions 335, which may include resource allocations for associated PDSCH transmissions 340. In some cases, resources used for PLICH transmissions 330 may be a subset of control channel resources that are configured for control channel transmissions of a higher latency service (e.g., the PLICH transmissions 330 of a URLLC service may use a subset of eMBB PDCCH resources), and a UE may perform blind detection within a subset of the control channel resources to identify PLICH transmission 330-*a*. In some cases, the payload size of PLICH transmissions 330 is relatively small, and a size of a common space and UE specific space for PLICH transmissions 330 may be a relatively small search space within the control channel resources, as will be discussed in more detail below with respect to FIG. 4. The relatively small search space for PLICH transmissions 330 may provide relatively few blind detection hypotheses and may allow detection of PLICH transmissions 330 in a relatively short amount of time relative to blind detections across all of the control channel resources. Furthermore, in some cases PLICH transmissions 330 may be transmitted using a preconfigured aggregation level which may further reduce the number of blind decoding hypotheses.

As indicated above, in some cases the PLICH transmissions 330 may include a number of parameters that indicate a location for PDCCH transmissions 335. In some cases, the parameters may include a VP, an IBF, an AL, and an IFC. The VP, in some cases, may be a positive integer value that indicates a number of frame intervals in which the location indication is valid, which in some examples may start from the frame in which the PLICH transmission 330 is transmitted. A specific example of PLICH parameters is discussed below with respect to FIG. 5. The IBF, in some cases, may be a positive integer value that indicates an interval between two adjacent indicated frames (e.g., an IBF of 1 indicates PDCCH transmissions 335 are to be monitored in every frame 310 through 325, and an IBF of 2 indicates PDCCH transmissions 335 are to be monitored in odd (or even) numbered frames 310 through 325 during the VP). The AL may indicate an aggregation level at which the corresponding PDCCH transmissions 335 are transmitted (e.g., 1, 2, 4, 8, 16, . . . , up to a maximum supported AL). The AL may be selected based on channel conditions and reliability targets, for example. The IFC may include an index of the first CCE of the PDCCH transmissions 335 (e.g., 0, 1, 2, . . . , up to a maximum index of a CCE that may be a first CCE for a PDCCH transmission 335).

Accordingly, the PLICH transmission 330-*a* of the first frame 310 may be valid from the first frame 310 (frame i) through last frame 325 (frame i+VP−1). Further, the IFC value and the aggregation level is fixed during the VP, and thus only a single hypothesis is needed to attempt to decode PDCCH transmissions 335. In some cases, the base station may not transmit a PDCCH transmission in a frame, and the UE may monitor the PDCCH resources and, upon not detecting a PDCCH transmission, may not monitor for associated PDSCH transmissions 340. In the example of FIG. 3, the first frame 310 may include a first PDCCH transmission 335-*a* that indicates resources for a first PDSCH transmission 340-*a*. Similarly, the second frame 315 may include a second PDCCH transmission 335-*b* that indicates resources for a second PDSCH transmission 340-*b*. Because the second frame 315 is within the VP, the second frame 315 does not include a PLICH transmission 330. In this example, the third frame 320 may not include a PDCCH transmission 335, and the UE may monitor the location for the PDCCH transmission and upon not detecting a transmission may wait and attempt to receive a next PDCCH transmission 335 in a subsequent frame according to the value of IBF. In this example, in the last frame 325 of the VP, a third PDCCH transmission 335-*c* may be received that indicates resources for a third PDSCH transmission 340-*c*. Thus, a UE configured to receive PLICH transmissions 330 may monitor for PDCCH transmissions 335 without blind decoding of multiple blind decoding hypotheses, which may enhance reliability and latency at the UE.

FIG. 4 illustrates an example of a location indicator search spaces 400 that support techniques for downlink control channel location indication in wireless communications in accordance with various aspects of the present disclosure. In some examples, location indicator search spaces 400 may be used to implement aspects of wireless communication system 100 or 200. In the example of FIG. 4, a first frame 410 may include a PLICH transmission, and a second frame 415 may not include a PLICH transmission. In some cases, a UE may search for PLICH transmissions in a first frame following an expiration of a VP, or upon being configured to search for a PLICH transmission when a service that uses PLICH transmissions is activated at the UE.

In some cases, a base station may configure a UE with a PLICH common search space 430 that may be within a PDCCH common search space 435. In the example of FIG. 4, a base station may also configure a PLICH UE specific search space 440 as a subset of a PDCCH UE specific search space 445. A UE may perform a blind detection procedure for detection of PLICH transmissions according to established blind decoding techniques used for decoding control channel transmissions. In some cases, the detection time may be reduced for PLICH detection based on a smaller search space, a smaller set of available aggregation levels, and a configured set of resources that may be searched (e.g., the base station may configure a specified subset of control channel resources for PLICH search spaces 430 and 440).

FIG. 5 illustrates an example of wireless resources 500 that support techniques for downlink control channel location indication in wireless communications in accordance with various aspects of the present disclosure. In some examples, wireless resources 500 may be used to implement aspects of wireless communication system 100 or 200. In the example of FIG. 5, a time period corresponding to a VP 505 of a PLICH transmission includes four radio frames (VP=4), namely a first frame 510, a second frame 515, a third frame 520, and a fourth frame 525 of the VP 505. In this example, a fifth frame 530 of a subsequent VP is illustrated.

In the example of FIG. 5, the first frame 510 includes a PLICH transmission 535-*a* that a UE (e.g., a UE 115 of FIG. 1 or 2) may use to determine a location of subsequent PDCCH transmissions 540. In this example, the PLICH transmission 535-*a* may include a VP parameter that is equal to four, an IBF of one, an AL of two, and an IFC of 2. Such parameters may uniquely identify a decoding hypothesis for each of the frames 520 through 525 within the VP 505. As discussed above, in some cases resources used for PLICH transmissions 535 may be a subset of control channel resources that are configured for control channel transmissions of a higher latency service (e.g., the PLICH transmissions 535 of a URLLC service may use a subset of eMBB PDCCH resources that are configured at a UE), and a UE may perform blind detection within a subset of the control channel resources of a first frame after a VP expires (e.g., the first frame 510 to identify the first PLICH transmission 535-*a* and the fifth frame 530 to identify a second PLICH transmission 535-*b* of a second VP). Accordingly, the PLICH transmission 535-*a* of the first frame 510 may be valid from the first frame 510 (frame i) through the fourth frame 525 (frame i+3), following which the UE may search for a subsequent PLICH transmission 330. In the example of FIG. 5, the third frame 520 may not include a PLICH transmission 330 or a PDCCH transmission 335 and the UE, upon not detecting a PDCCH transmission, may not monitor for an associated PDSCH transmission until a subsequent frame in which a PLICH transmission 535 is detected.

In the example of FIG. 5, the first frame 510 may include a first PDCCH transmission 540-*a* that indicates resources for a first PDSCH transmission 545-*a*. Similarly, the second frame 515 may include a second PDCCH transmission 540-*b* that indicates resources for a second PDSCH transmission 545-*b*, and the fourth frame 525 may include a third PDCCH transmission 540-*c* that indicates resources for a third PDSCH transmission 545-*c*.

Figure 6:
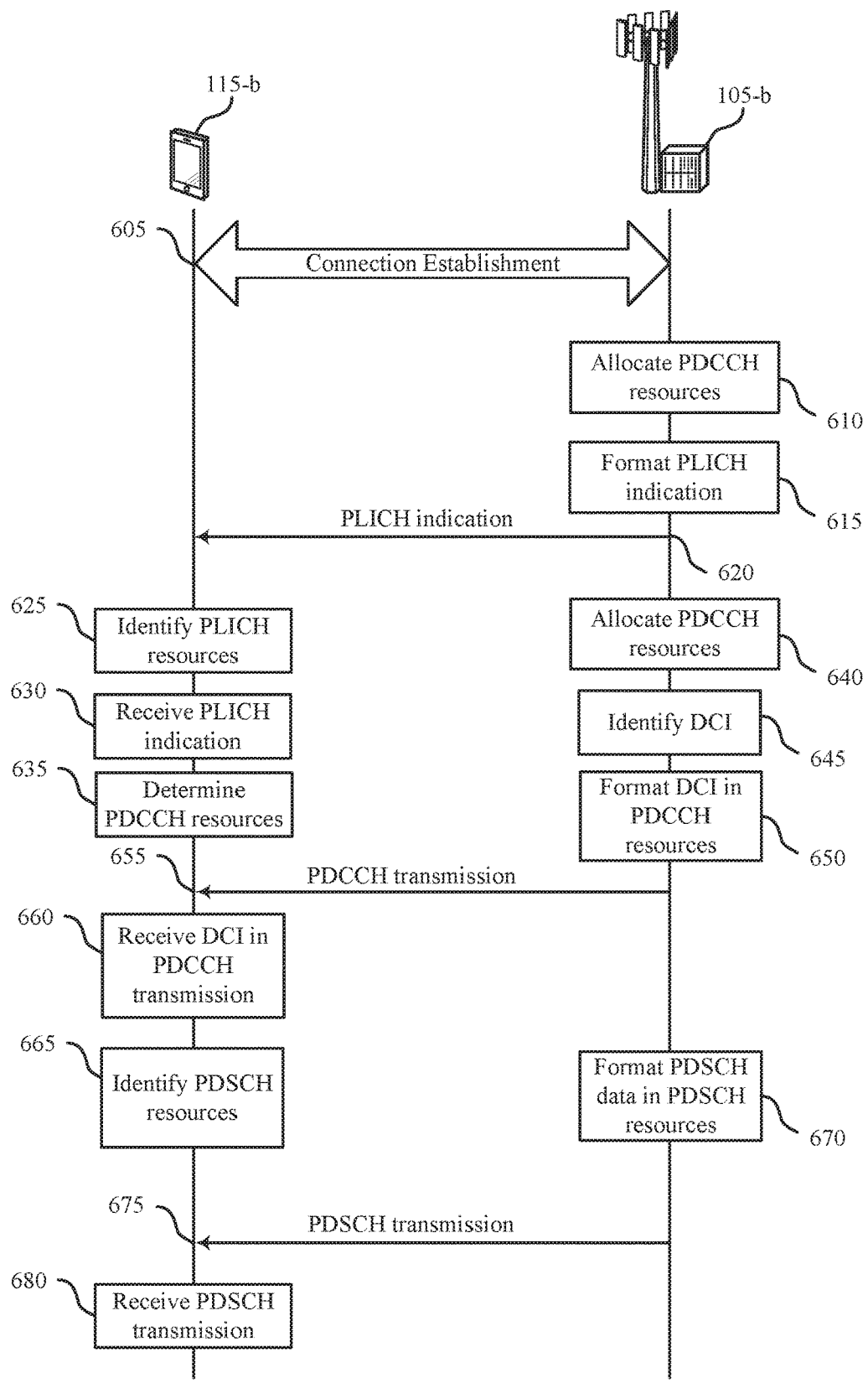
FIG. 6 illustrates an example of a process flow that supports techniques for downlink control channel location indication in wireless communications in accordance with aspects of the present disclosure.

FIG. 6 illustrates an example of a process flow 600 that supports techniques for downlink control channel location indication in wireless communications in accordance with various aspects of the present disclosure. In some examples, process flow 600 may implement aspects of wireless communication system 100 or 200. The base station 105-*b* may be an example of a base station 105 of FIG. 1 or 2, and the UE 115-*b* may be an example of a UE 115 of FIG. 1 or 2.

Initially, the base station 105-*b* and UE 115-*b* may establish a connection 605. Such a connection establishment may be performed using established connection establishment techniques. In some cases, the connection may support two or more services that may be active between the base station 105-*a* and the UE 115-*a*, such as a URLLC service and an eMBB service for example. In some cases, as part of the connection establishment, or in signaling (e.g., radio resource control (RRC) signaling) after the connection establishment, the base station 105-*b* may configure resources that may be used to provide a location indicator transmission (e.g., a subset of a set of configured control channel resources).

At 610, the base station 105-*b* may allocate control channel resources for the UE 115-*b*. In some cases, the control channel resources may be PDCCH resources that the UE 115-*a* is to monitor for downlink control information. In some cases, the base station 105-*b* may allocate control channel resources for the UE 115-*a* based on data that is to be transmitted to or from the UE 115-*a* (e.g., based on a buffer status for data that is to be transmitted). In some cases, the control channel resources may be allocated for a low latency service that may be a subset of control channel resources that may be allocated for a higher latency service.

At 615, the base station 105-*b* may format an location indicator transmission, such as a PLICH indication. In some cases, the location indicator may include a number of parameters that may allow the UE 115-*b* to identify a location and coding for control information that is to be transmitted to the UE 115-*b*. In some cases, the parameters may include a VP indication, an IBF indication, an AL indication, an IFC indication, or any combination thereof. The base station 105-*a* may transmit the location indicator, such as in PLICH indication 620 to the UE 115-*b*.

At 625, the UE 115-*b* may identify location indicator resources, such as PLICH resources, that are to be monitored for a location indicator transmission. In some cases, the resources to be monitored may include a set of resources in a location indicator search space, and the UE 115-*b* may be configured for blind decoding different decoding hypotheses within the location indicator search space to identify the location indicator transmission.

At 630, the UE 115-*b* may receive the location indicator, such as a PLICH indication of control channel resources. In some cases, as indicated above, the UE 115-*b* may perform blind decoding over a configured PLICH search space and determine the location indicator based on a successful blind decode of a blind decoding hypothesis performed on the search space.

At 635, the UE 115-*b* may determine PDCCH resources for a PDCCH transmission. In some cases, the location indicator may include parameters that indicate a starting CCE for the PDCCH transmission, an aggregation level for the PDCCH transmission, and an indication of one or more slots, frames, or TTIs that are to be monitored for the PDCCH transmission. In some cases, the location indication may also include a valid period during which control channel transmissions will be transmitted according to the parameters.

At 640, the base station 105-*b* may allocate PDCCH resources for a control channel transmission to the UE 115-*b*. The PDCCH resources may be allocated according to resources indicated in the PLICH indication 620 during a valid period of the PLICH indication, for example.

At 645, the base station 105-*b* may identify downlink control information (DCI) to be transmitted to the UE 115-*b* in the control channel resources. The DCI may include, for example, an allocation of PDSCH resources that have been allocated to the UE 115-*b*.

At 650, the base station 105-*b* may format the DCI into the allocated PDCCH resources. In some cases, the base station may format the DCI to start at the indicated first CCE within the PDCCH resources, and may encode the DCI according to an aggregation level and coding scheme that was identified for the control channel transmission in the location indicator. The base station 105-*b* may transmit the PDCCH transmission 655 to the UE 115-*b* according to the identified coding and using the PDCCH resources configured in the location indicator.

At 660, the UE 115-*b* may receive the DCI in the PDCCH transmission. In some cases, the UE 115-*b* may receive the DCI based on the location indicator provided by the base station 105-*b*. At 665, the UE 115-*b* may identify PDSCH resources for a PDSCH transmission. In some cases, the PDSCH resources may be identified based on DCI included in the PDCCH transmission. The base station 105-*b* may format PDSCH data in PDSCH resources at 670, and transmit the PDSCH transmission 675, which may be received by the UE 115-*b* at 680. In some cases, the PLICH indication 620, the PDCCH transmission 655, and the PDSCH transmission 675 may each be transmitted in a same radio frame, slot, or TTI. In some cases, the PLICH indication 620 may be valid for a plurality of frames, slots, or TTIs, and one or more additional PDCCH transmissions 655 may be transmitted that indicate corresponding PDSCH transmissions 675 in a same frame, slot, or TTI.

Figure 7:
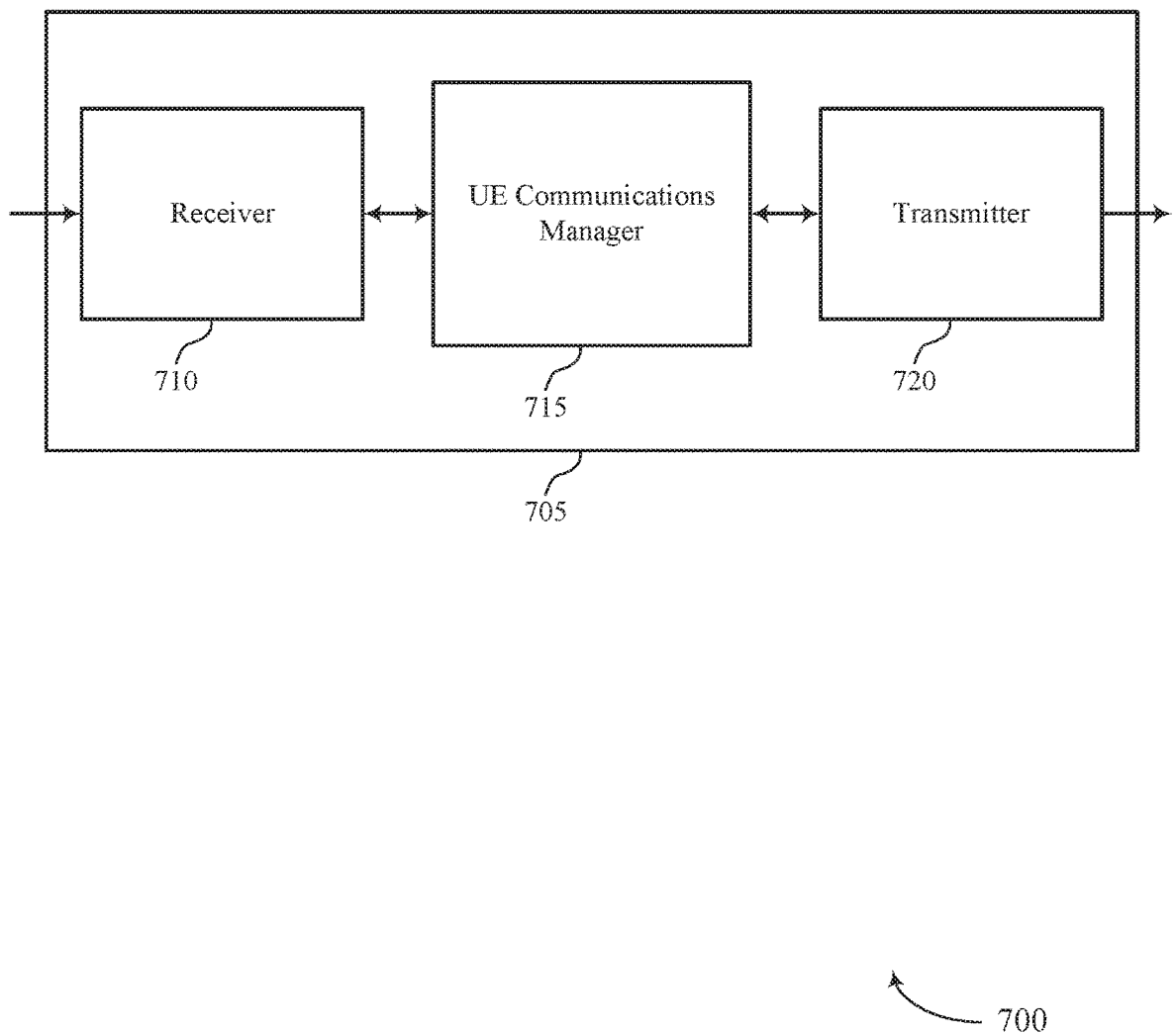
FIGS. 7 through 9 show block diagrams of a device that supports techniques for downlink control channel location indication in wireless communications in accordance with aspects of the present disclosure.

FIG. 7 shows a block diagram 700 of a wireless device 705 that supports techniques for downlink control channel location indication in wireless communications in accordance with aspects of the present disclosure. Wireless device 705 may be an example of aspects of a user equipment (UE) 115 as described herein. Wireless device 705 may include receiver 710, UE communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to techniques for downlink control channel location indication in wireless communications, etc.). Information may be passed on to other components of the device. The receiver 710 may be an example of aspects of the transceiver 1035 described with reference to FIG. 10. The receiver 710 may utilize a single antenna or a set of antennas. Receiver 710 may receive the shared channel transmissions via downlink shared channel resources, receive control channel transmissions via downlink control channel resources, and receive location indicator transmissions via location indicator channel transmissions.

UE communications manager 715 may be an example of aspects of the UE communications manager 1015 described with reference to FIG. 10. UE communications manager 715 and/or at least some of its various sub-components may be implemented in hardware, software executed by a processor, firmware, or any combination thereof. If implemented in software executed by a processor, the functions of the UE communications manager 715 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE communications manager 715 and/or at least some of its various sub-components may be physically located at various positions, including being distributed such that portions of functions are implemented at different physical locations by one or more physical devices. In some examples, UE communications manager 715 and/or at least some of its various sub-components may be a separate and distinct component in accordance with various aspects of the present disclosure. In other examples, UE communications manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 715 may receive, from a base station, a location indicator transmission having a location indicator that identifies downlink control channel resources that are to be monitored by the UE for downlink control information transmissions, monitor the downlink control channel resources based on the received location indicator, receive downlink control channel information on the downlink control channel resources based on the monitoring, and identify, based on the downlink control channel information, downlink shared channel resources that have been allocated for shared channel transmissions to the UE.

Transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may utilize a single antenna or a set of antennas.

Figure 8:
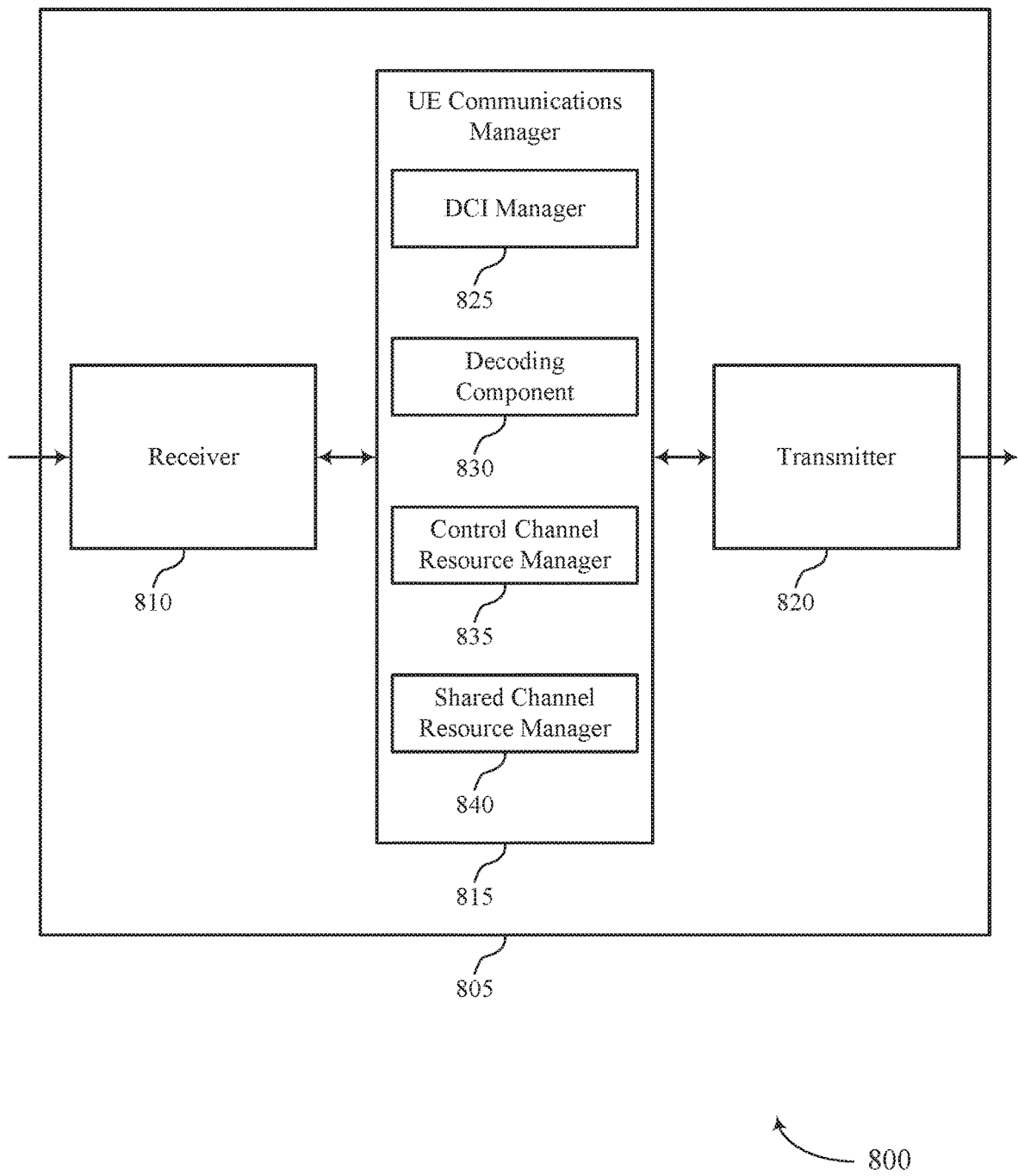

FIG. 8 shows a block diagram 800 of a wireless device 805 that supports techniques for downlink control channel location indication in wireless communications in accordance with aspects of the present disclosure. Wireless device 805 may be an example of aspects of a wireless device 705 or a UE 115 as described with reference to FIG. 7. Wireless device 805 may include receiver 810, UE communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to techniques for downlink control channel location indication in wireless communications, etc.). Information may be passed on to other components of the device. The receiver 810 may be an example of aspects of the transceiver 1035 described with reference to FIG. 10. The receiver 810 may utilize a single antenna or a set of antennas.

UE communications manager 815 may be an example of aspects of the UE communications manager 1015 described with reference to FIG. 10. UE communications manager 815 may also include downlink control information (DCI) manager 825, decoding component 830, control channel resource manager 835, and shared channel resource manager 840.

DCI manager 825 may receive, from the base station, a location indicator transmission having a location indicator that identifies downlink control channel resources that are to be monitored by the UE for downlink control information transmissions. In some cases, the shared channel transmissions are transmissions of a first service that has a lower latency than a second service, and where the search space corresponds to a subset of a control channel search space associated with the second service. In some cases, the first service is an ultra-reliable low latency (URLLC) service and the second service is an enhanced mobile broadband (eMBB) service. In some cases, a coding rate of the location indicator transmission is lower than a coding rate of control channel transmissions of the second service that are transmitted in the control channel search space associated with the second service.

Decoding component 830 may monitor the downlink control channel resources based on the received location indicator and decode transmissions received on the monitored downlink control channel resources.

Control channel resource manager 835 may receive downlink control channel information on the downlink control channel resources based on the monitoring. In some cases, a same set of downlink control channel resources may be monitored for a period of time that may be indicated by a valid period indicator in a location indicator transmission.

Shared channel resource manager 840 may identify, based on the downlink control channel information, downlink shared channel resources that have been allocated for shared channel transmissions to the UE.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may utilize a single antenna or a set of antennas.

Figure 9:
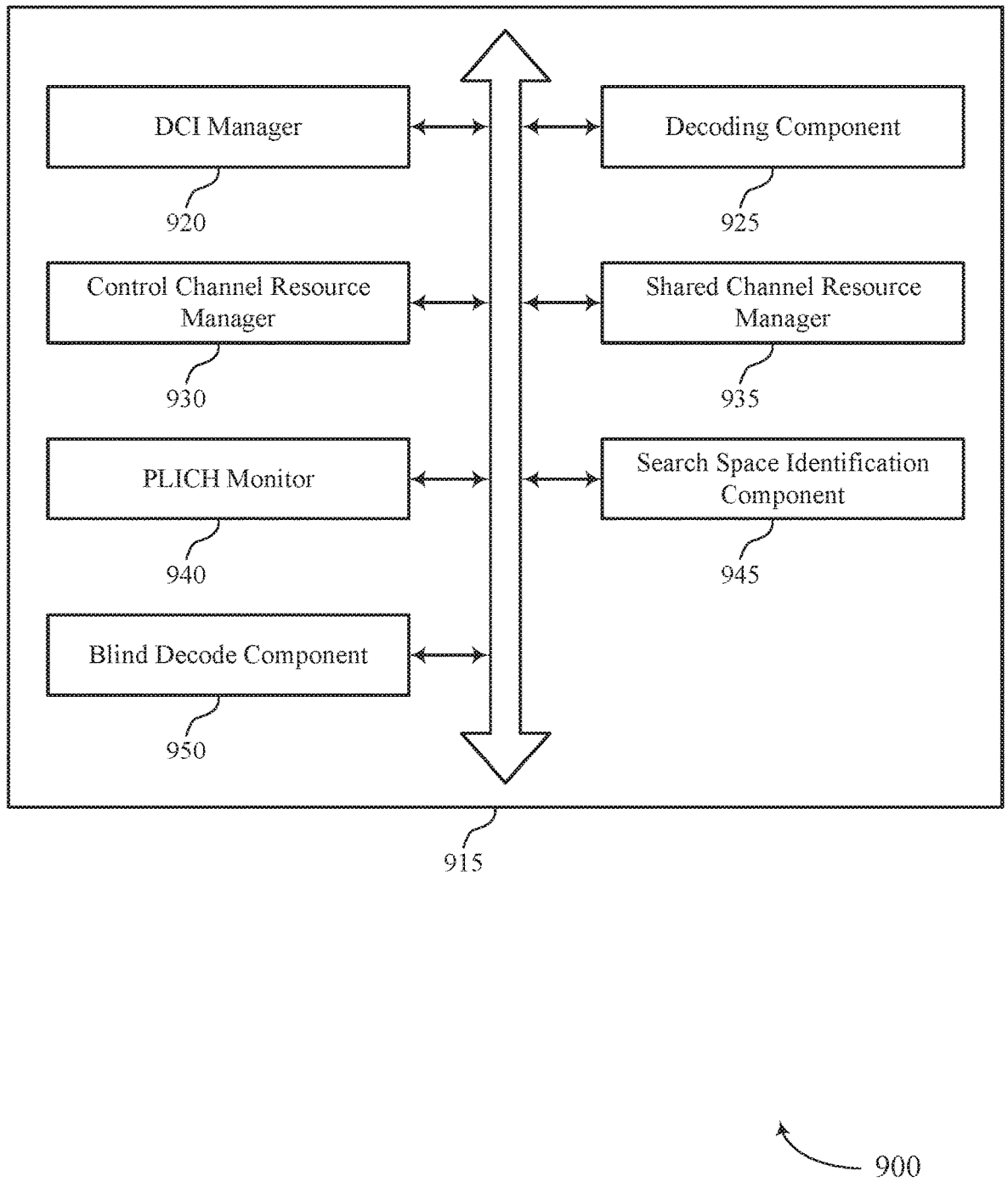

FIG. 9 shows a block diagram 900 of a UE communications manager 915 that supports techniques for downlink control channel location indication in wireless communications in accordance with aspects of the present disclosure. The UE communications manager 915 may be an example of aspects of a UE communications manager 715, a UE communications manager 815, or a UE communications manager 1015 described with reference to FIGS. 7, 8, and 10. The UE communications manager 915 may include DCI manager 920, decoding component 925, control channel resource manager 930, shared channel resource manager 935, PLICH monitor 940, search space identification component 945, and blind decode component 950. Each of these modules may communicate, directly or indirectly, with one another (e.g., via one or more buses).

DCI manager 920 may receive, from the base station, a location indicator transmission having a location indicator that identifies downlink control channel resources that are to be monitored by the UE for downlink control information transmissions. In some cases, the shared channel transmissions are transmissions of a first service that has a lower latency than a second service, and where the search space corresponds to a subset of a control channel search space associated with the second service. In some cases, the first service is an ultra-reliable low latency (URLLC) service and the second service is an enhanced mobile broadband (eMBB) service. In some cases, a coding rate of the location indicator transmission is lower than a coding rate of control channel transmissions of the second service that are transmitted in the control channel search space associated with the second service.

Decoding component 925 may monitor the downlink control channel resources based on the received location indicator and decode transmissions received on the monitored downlink control channel resources.

Control channel resource manager 930 may receive downlink control channel information on the downlink control channel resources based on the monitoring. In some cases, a same set of downlink control channel resources may be monitored for a period of time that may be indicated by a valid period indicator in a location indicator transmission.

Shared channel resource manager 935 may identify, based on the downlink control channel information, downlink shared channel resources that have been allocated for shared channel transmissions to the UE.

PLICH monitor 940 may monitor PLICH resources for a location indicator transmission. In some cases, the receiving the location indicator transmission includes receiving a PLICH transmission that includes the location indicator. In some cases, the PLICH transmission and a first instance of the downlink control channel resources to be monitored are in a same radio frame. In some cases, the location indicator includes one or more of a valid period for the location indicator, an interval at which the downlink control channel resources are to be monitored, an aggregation level of the downlink control information transmitted using the downlink control channel resources, an index of a first control channel element of the downlink control channel resources, or any combination thereof. In some cases, the valid period corresponds to a number of radio frame intervals during which the UE is to monitor the identified downlink control channel resources, and where the UE monitors for a second PLICH transmission responsive to an expiration of the valid period.

Search space identification component 945 may identify a search space of downlink transmission resources that are configured for transmission of the location indicator transmission. In some cases, the search space includes a common search space for multiple UEs and a UE-specific search space.

Blind decode component 950 may search the search space for the location indicator transmission and decode the location indicator transmission responsive to the searching. In some cases, the searching includes blindly decoding a set of decoding hypotheses within the search space.

Figure 10:
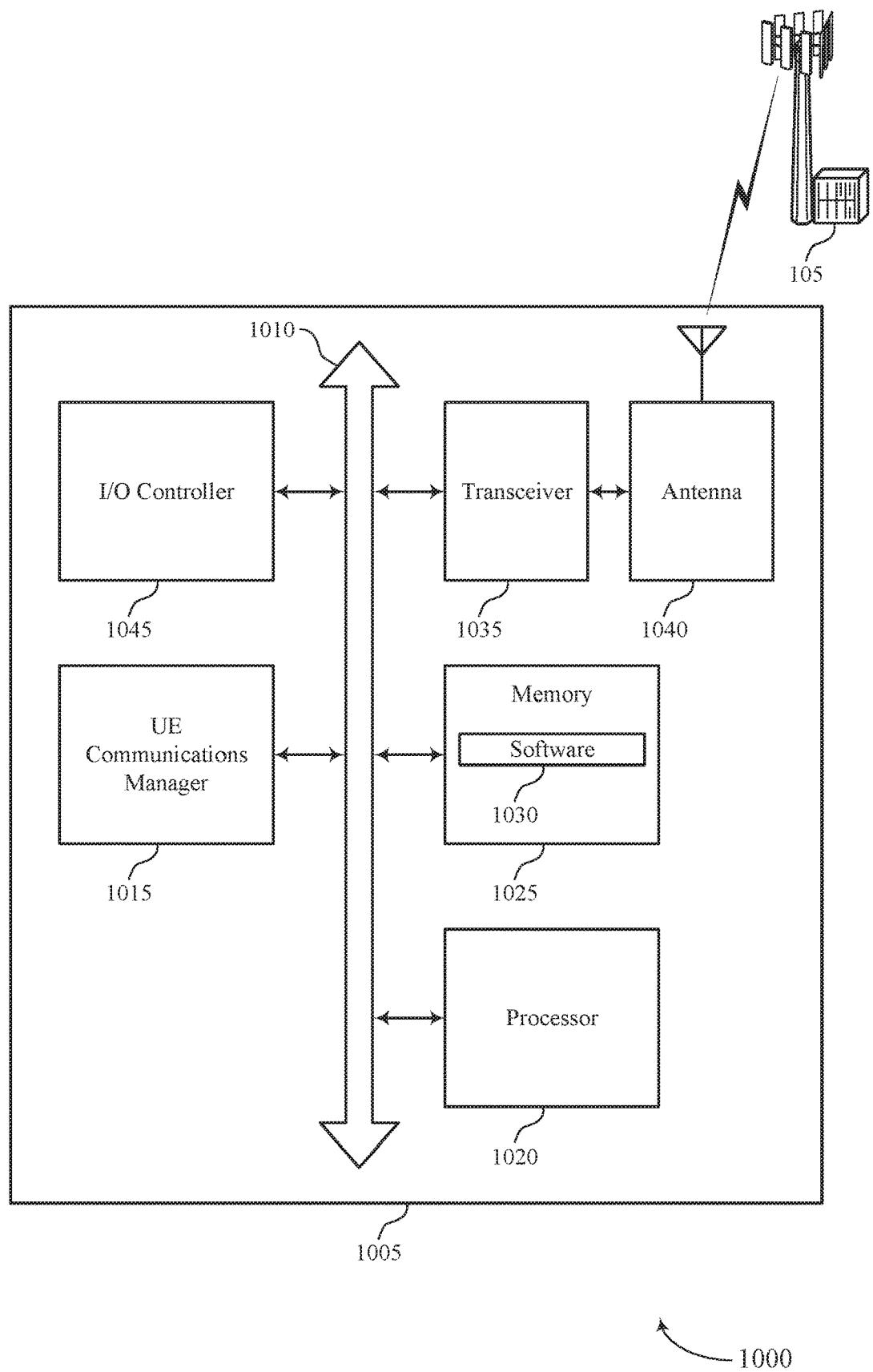
FIG. 10 illustrates a block diagram of a system including a UE that supports techniques for downlink control channel location indication in wireless communications in accordance with aspects of the present disclosure.

FIG. 10 shows a diagram of a system 1000 including a device 1005 that supports techniques for downlink control channel location indication in wireless communications in accordance with aspects of the present disclosure. Device 1005 may be an example of or include the components of wireless device 705, wireless device 805, or a UE 115 as described above, e.g., with reference to FIGS. 7 and 8. Device 1005 may include components for bi-directional voice and data communications including components for transmitting and receiving communications, including UE communications manager 1015, processor 1020, memory 1025, software 1030, transceiver 1035, antenna 1040, and I/O controller 1045. These components may be in electronic communication via one or more buses (e.g., bus 1010). Device 1005 may communicate wirelessly with one or more base stations 105.

Processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting techniques for downlink control channel location indication in wireless communications).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware or software operation such as the interaction with peripheral components or devices.

Software 1030 may include code to implement aspects of the present disclosure, including code to support techniques for downlink control channel location indication in wireless communications. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

I/O controller 1045 may manage input and output signals for device 1005. I/O controller 1045 may also manage peripherals not integrated into device 1005. In some cases, I/O controller 1045 may represent a physical connection or port to an external peripheral. In some cases, I/O controller 1045 may utilize an operating system such as iOS®, ANDROID®, MS-DOS®, MS-WINDOWS®, OS/2®, UNIX®, LINUX®, or another known operating system. In other cases, I/O controller 1045 may represent or interact with a modem, a keyboard, a mouse, a touchscreen, or a similar device. In some cases, I/O controller 1045 may be implemented as part of a processor. In some cases, a user may interact with device 1005 via I/O controller 1045 or via hardware components controlled by I/O controller 1045.

Figure 11:
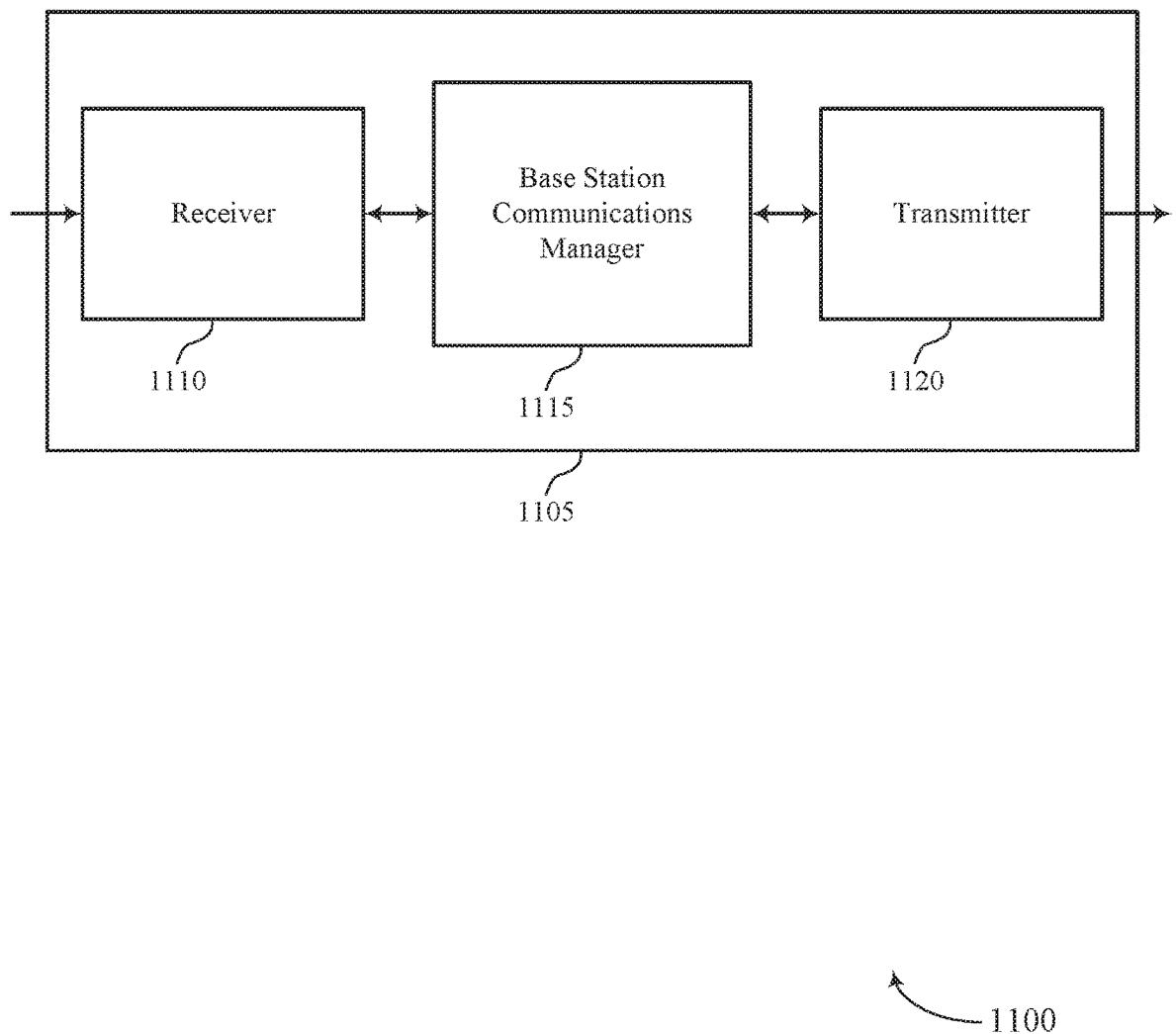
FIGS. 11 through 13 show block diagrams of a device that supports techniques for downlink control channel location indication in wireless communications in accordance with aspects of the present disclosure.

FIG. 11 shows a block diagram 1100 of a wireless device 1105 that supports techniques for downlink control channel location indication in wireless communications in accordance with aspects of the present disclosure. Wireless device 1105 may be an example of aspects of a base station 105 as described herein. Wireless device 1105 may include receiver 1110, base station communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to techniques for downlink control channel location indication in wireless communications, etc.). Information may be passed on to other components of the device. The receiver 1110 may be an example of aspects of the transceiver 1435 described with reference to FIG. 14. The receiver 1110 may utilize a single antenna or a set of antennas.

Base station communications manager 1115 may be an example of aspects of the base station communications manager 1415 described with reference to FIG. 14.

Base station communications manager 1115 and/or at least some of its various sub-components may be implemented in hardware, software executed by a processor, firmware, or any combination thereof. If implemented in software executed by a processor, the functions of the base station communications manager 1115 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station communications manager 1115 and/or at least some of its various sub-components may be physically located at various positions, including being distributed such that portions of functions are implemented at different physical locations by one or more physical devices. In some examples, base station communications manager 1115 and/or at least some of its various sub-components may be a separate and distinct component in accordance with various aspects of the present disclosure. In other examples, base station communications manager 1115 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1115 may transmit a location indicator transmission to a UE, the location indicator transmission including a location indicator that identifies downlink control channel resources that are to be monitored by the UE for downlink control information transmissions, transmit downlink control channel information to the UE using the identified downlink control channel resources, the downlink control channel information indicating downlink shared channel resources that have been allocated for shared channel transmissions to the UE, and transmit the shared channel transmissions to the via the downlink shared channel resources.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1435 described with reference to FIG. 14. The transmitter 1120 may utilize a single antenna or a set of antennas.

Figure 12:
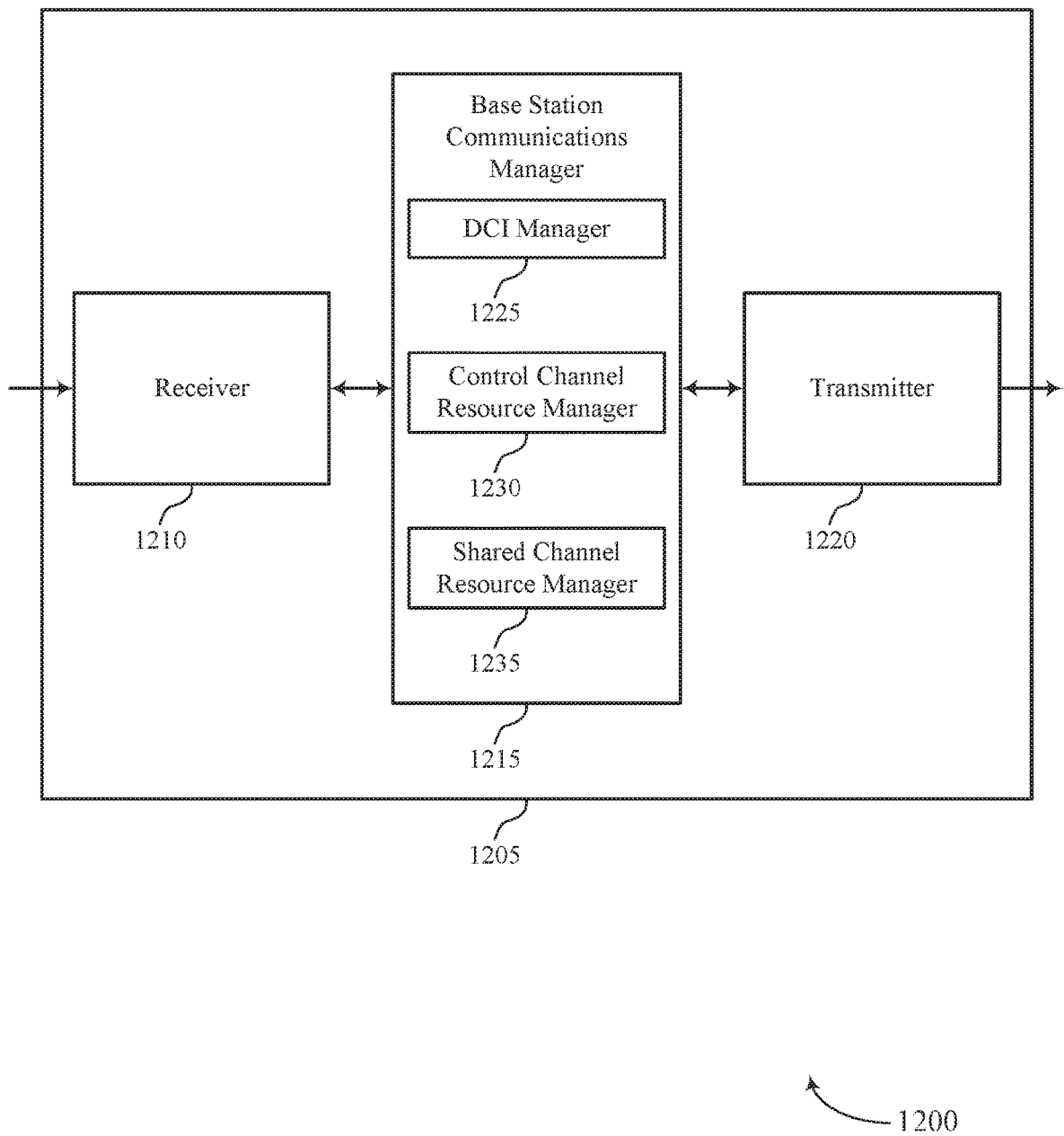

FIG. 12 shows a block diagram 1200 of a wireless device 1205 that supports techniques for downlink control channel location indication in wireless communications in accordance with aspects of the present disclosure. Wireless device 1205 may be an example of aspects of a wireless device 1105 or a base station 105 as described with reference to FIG. 11. Wireless device 1205 may include receiver 1210, base station communications manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to techniques for downlink control channel location indication in wireless communications, etc.). Information may be passed on to other components of the device. The receiver 1210 may be an example of aspects of the transceiver 1435 described with reference to FIG. 14. The receiver 1210 may utilize a single antenna or a set of antennas.

Base station communications manager 1215 may be an example of aspects of the base station communications manager 1415 described with reference to FIG. 14. Base station communications manager 1215 may also include DCI manager 1225, control channel resource manager 1230, and shared channel resource manager 1235.

DCI manager 1225 may transmit a location indicator transmission to a UE, the location indicator transmission including a location indicator that identifies downlink control channel resources that are to be monitored by the UE for downlink control information transmissions. In some cases, the shared channel transmissions are transmissions of a first service that has a lower latency than a second service, and where the search space corresponds to a subset of a control channel search space associated with the second service. In some cases, the first service is an URLLC service and the second service is an eMBB service. In some cases, a coding rate of the location indicator transmission is lower than a coding rate of control channel transmissions of the second service that are transmitted in the control channel search space associated with the second service.

Control channel resource manager 1230 may transmit downlink control channel information to the UE using the identified downlink control channel resources, the downlink control channel information indicating downlink shared channel resources that have been allocated for shared channel transmissions to the UE.

Shared channel resource manager 1235 may transmit the shared channel transmissions to the via the downlink shared channel resources.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1435 described with reference to FIG. 14. The transmitter 1220 may utilize a single antenna or a set of antennas.

Figure 13:
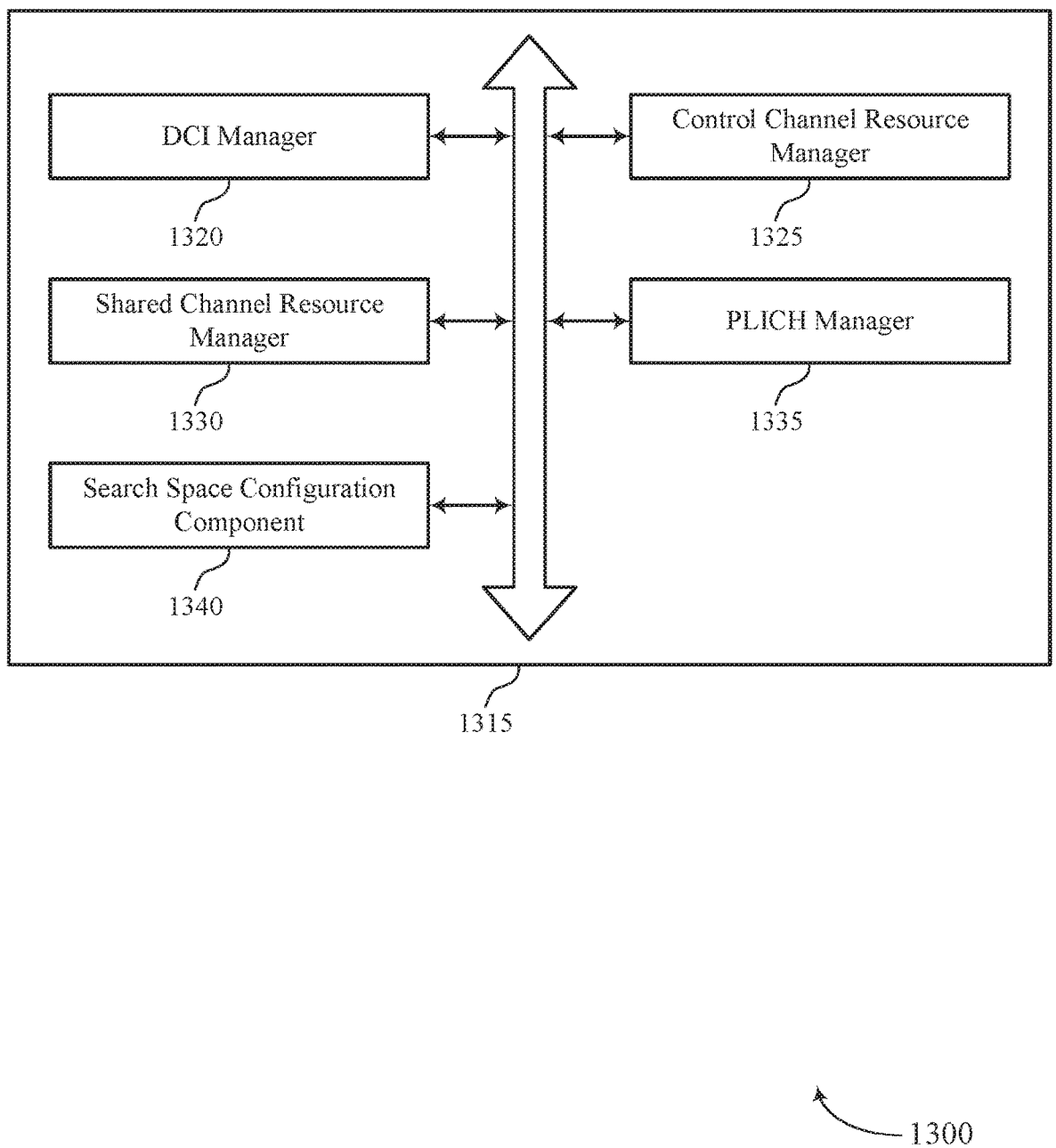

FIG. 13 shows a block diagram 1300 of a base station communications manager 1315 that supports techniques for downlink control channel location indication in wireless communications in accordance with aspects of the present disclosure. The base station communications manager 1315 may be an example of aspects of a base station communications manager 1415 described with reference to FIGS. 11, 12, and 14. The base station communications manager 1315 may include DCI manager 1320, control channel resource manager 1325, shared channel resource manager 1330, PLICH manager 1335, and search space configuration component 1340. Each of these modules may communicate, directly or indirectly, with one another (e.g., via one or more buses).

DCI manager 1320 may transmit a location indicator transmission to a UE, the location indicator transmission including a location indicator that identifies downlink control channel resources that are to be monitored by the UE for downlink control information transmissions. In some cases, the shared channel transmissions are transmissions of a first service that has a lower latency than a second service, and where the search space corresponds to a subset of a control channel search space associated with the second service. In some cases, the first service is an URLLC service and the second service is an eMBB service. In some cases, a coding rate of the location indicator transmission is lower than a coding rate of control channel transmissions of the second service that are transmitted in the control channel search space associated with the second service.

Control channel resource manager 1325 may transmit downlink control channel information to the UE using the identified downlink control channel resources, the downlink control channel information indicating downlink shared channel resources that have been allocated for shared channel transmissions to the UE.

Shared channel resource manager 1330 may transmit the shared channel transmissions to the via the downlink shared channel resources.

PLICH manager 1335 may configure PLICH resources for a location indicator transmission. In some cases, the transmitting the location indicator transmission includes transmitting a PLICH transmission that includes the location indicator. In some cases, the PLICH transmission and a first instance of the downlink control channel resources that are to be monitored are in a same radio frame. In some cases, the location indicator includes one or more of a valid period for the location indicator, an interval at which the downlink control channel resources are to be monitored by the UE, an aggregation level of the downlink control information transmitted using the downlink control channel resources, an index of a first control channel element of the downlink control channel resources, or any combination thereof. In some cases, the valid period corresponds to a number of radio frame intervals during which the UE is to monitor the identified downlink control channel resources, and where the UE monitors for a second PLICH transmission responsive to an expiration of the valid period.

Search space configuration component 1340 may establish a connection with the UE and configuring a search space of downlink transmission resources for transmission of the location indicator transmission. In some cases, the search space includes a common search space for multiple UEs and a UE-specific search space.

Figure 14:
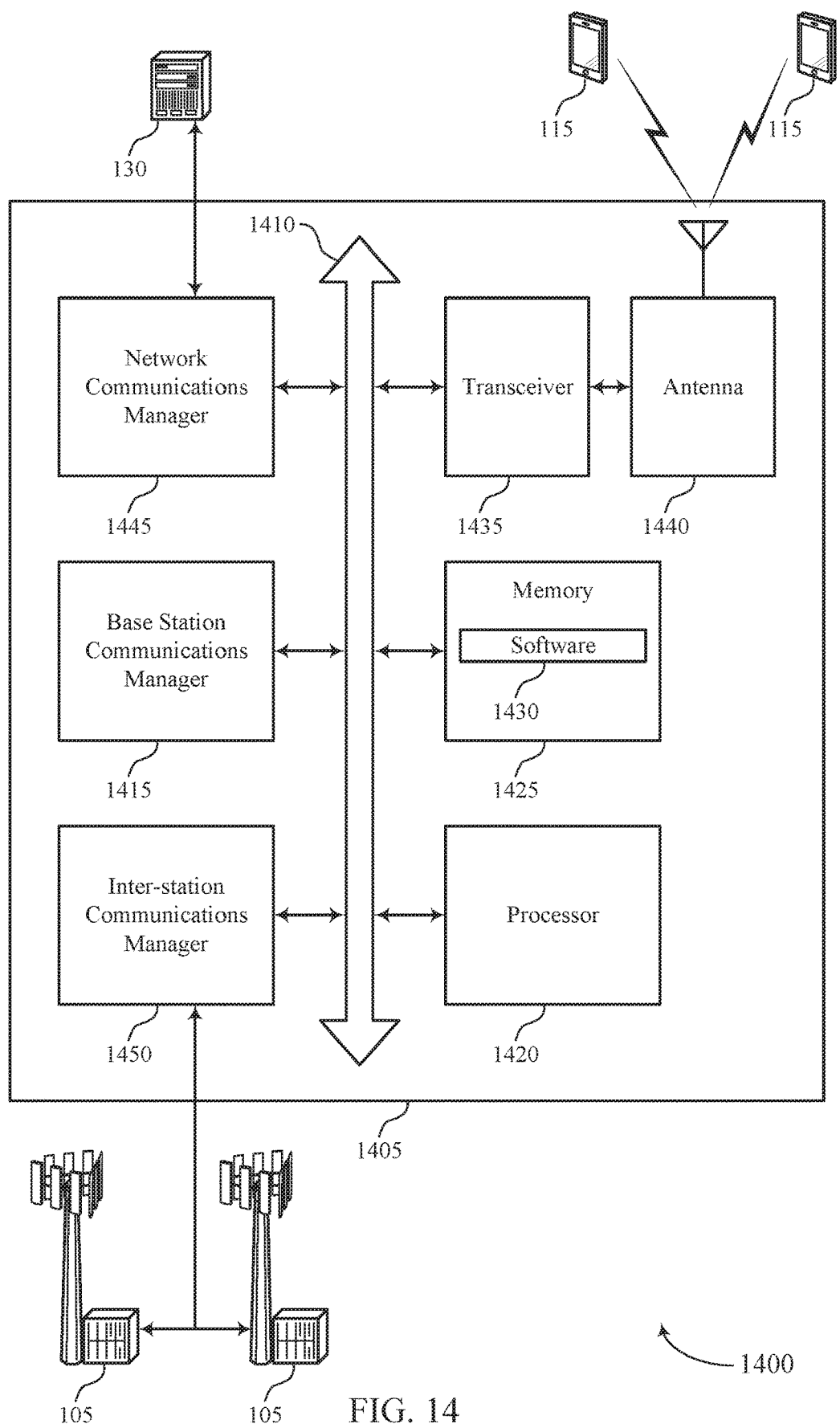
FIG. 14 illustrates a block diagram of a system including a base station that supports techniques for downlink control channel location indication in wireless communications in accordance with aspects of the present disclosure.

FIG. 14 shows a diagram of a system 1400 including a device 1405 that supports techniques for downlink control channel location indication in wireless communications in accordance with aspects of the present disclosure. Device 1405 may be an example of or include the components of base station 105 as described above, e.g., with reference to FIG. 1. Device 1405 may include components for bi-directional voice and data communications including components for transmitting and receiving communications, including base station communications manager 1415, processor 1420, memory 1425, software 1430, transceiver 1435, antenna 1440, network communications manager 1445, and inter-station communications manager 1450. These components may be in electronic communication via one or more buses (e.g., bus 1410). Device 1405 may communicate wirelessly with one or more UEs 115.

Processor 1420 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1420 may be configured to operate a memory array using a memory controller. In other cases, a memory controller may be integrated into processor 1420. Processor 1420 may be configured to execute computer-readable instructions stored in a memory to perform various functions (e.g., functions or tasks supporting techniques for downlink control channel location indication in wireless communications).

Memory 1425 may include RAM and ROM. The memory 1425 may store computer-readable, computer-executable software 1430 including instructions that, when executed, cause the processor to perform various functions described herein. In some cases, the memory 1425 may contain, among other things, a BIOS which may control basic hardware or software operation such as the interaction with peripheral components or devices.

Software 1430 may include code to implement aspects of the present disclosure, including code to support techniques for downlink control channel location indication in wireless communications. Software 1430 may be stored in a non-transitory computer-readable medium such as system memory or other memory. In some cases, the software 1430 may not be directly executable by the processor but may cause a computer (e.g., when compiled and executed) to perform functions described herein.

Transceiver 1435 may communicate bi-directionally, via one or more antennas, wired, or wireless links as described above. For example, the transceiver 1435 may represent a wireless transceiver and may communicate bi-directionally with another wireless transceiver. The transceiver 1435 may also include a modem to modulate the packets and provide the modulated packets to the antennas for transmission, and to demodulate packets received from the antennas.

In some cases, the wireless device may include a single antenna 1440. However, in some cases the device may have more than one antenna 1440, which may be capable of concurrently transmitting or receiving multiple wireless transmissions.

Network communications manager 1445 may manage communications with the core network (e.g., via one or more wired backhaul links). For example, the network communications manager 1445 may manage the transfer of data communications for client devices, such as one or more UEs 115.

Inter-station communications manager 1450 may manage communications with other base station 105, and may include a controller or scheduler for controlling communications with UEs 115 in cooperation with other base stations 105. For example, the inter-station communications manager 1450 may coordinate scheduling for transmissions to UEs 115 for various interference mitigation techniques such as beamforming or joint transmission. In some examples, inter-station communications manager 1450 may provide an X2 interface within an Long Term Evolution (LTE)/LTE-A wireless communication network technology to provide communication between base stations 105.

Figure 15:
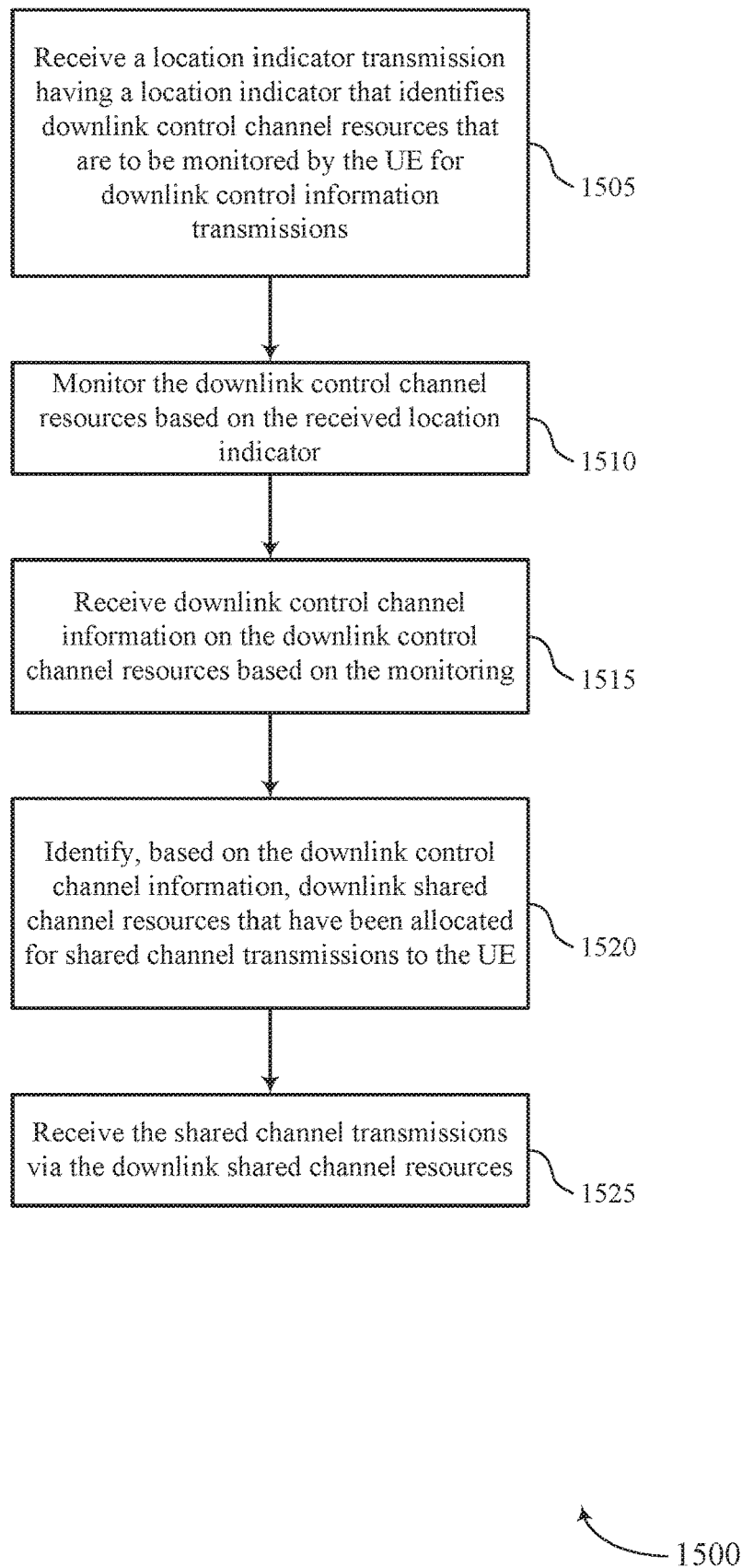
FIGS. 15 through 18 illustrate methods for techniques for downlink control channel location indication in wireless communications in accordance with aspects of the present disclosure.

FIG. 15 shows a flowchart illustrating a method 1500 for techniques for downlink control channel location indication in wireless communications in accordance with aspects of the present disclosure. The operations of method 1500 may be implemented by a UE 115 or its components as described herein. For example, the operations of method 1500 may be performed by a UE communications manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At 1505 the UE 115 may receive, from a base station, a location indicator transmission having a location indicator that identifies downlink control channel resources that are to be monitored by the UE for downlink control information transmissions. The operations of 1505 may be performed according to the methods described herein. In certain examples, aspects of the operations of 1505 may be performed by a DCI manager as described with reference to FIGS. 7 through 10.

At 1510 the UE 115 may monitor the downlink control channel resources based at least in part on the received location indicator. The operations of 1510 may be performed according to the methods described herein. In certain examples, aspects of the operations of 1510 may be performed by a decoding component as described with reference to FIGS. 7 through 10.

At 1515 the UE 115 may receive downlink control channel information on the downlink control channel resources based at least in part on the monitoring. The operations of 1515 may be performed according to the methods described herein. In certain examples, aspects of the operations of 1515 may be performed by a control channel resource manager as described with reference to FIGS. 7 through 10.

At 1520 the UE 115 may identify, based at least in part on the downlink control channel information, downlink shared channel resources that have been allocated for shared channel transmissions to the UE. The operations of 1520 may be performed according to the methods described herein. In certain examples, aspects of the operations of 1520 may be performed by a shared channel resource manager as described with reference to FIGS. 7 through 10.

At 1525 the UE 115 may receive the shared channel transmissions via the downlink shared channel resources. The operations of 1525 may be performed according to the methods described herein. In certain examples, aspects of the operations of 1525 may be performed by a receiver as described with reference to FIGS. 7 through 10.

Figure 16:
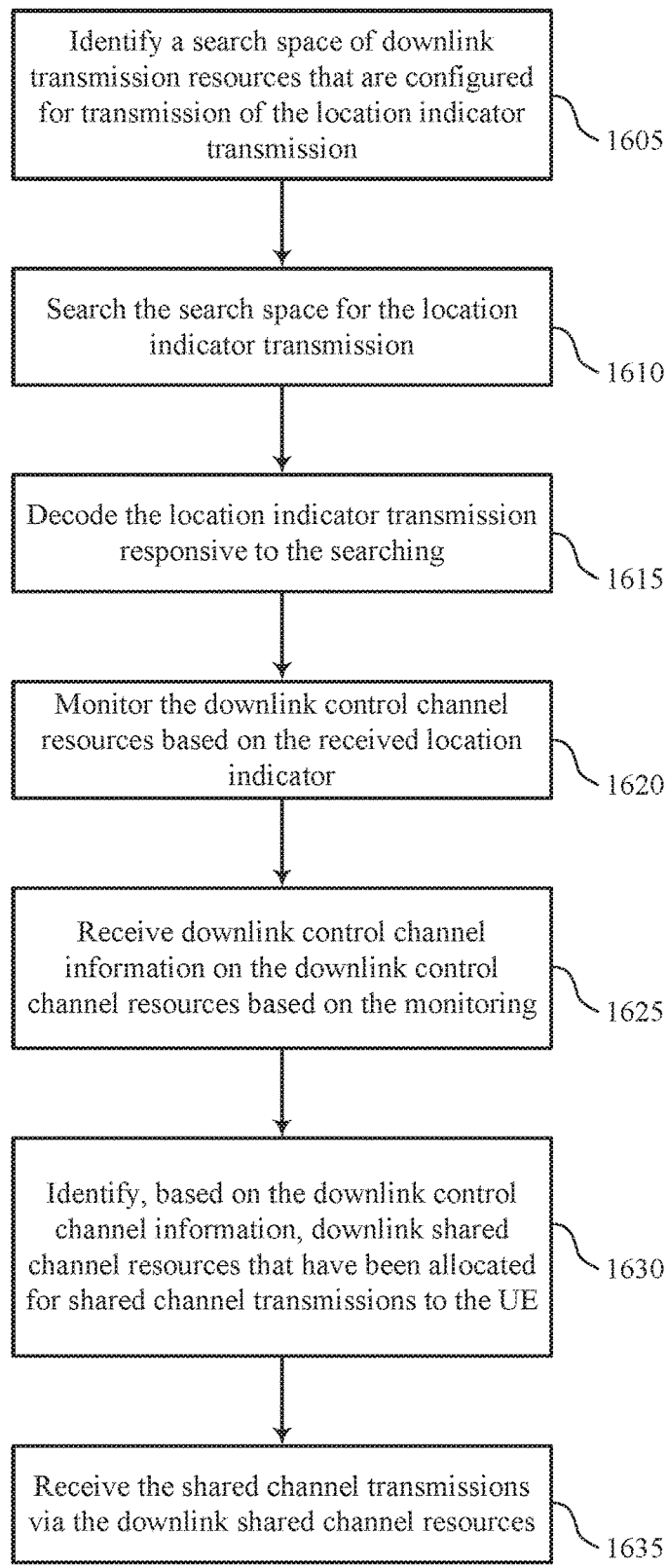

FIG. 16 shows a flowchart illustrating a method 1600 for techniques for downlink control channel location indication in wireless communications in accordance with aspects of the present disclosure. The operations of method 1600 may be implemented by a UE 115 or its components as described herein. For example, the operations of method 1600 may be performed by a UE communications manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At 1605 the UE 115 may identify a search space of downlink transmission resources that are configured for transmission of the location indicator transmission. The operations of 1605 may be performed according to the methods described herein. In certain examples, aspects of the operations of 1605 may be performed by a search space identification component as described with reference to FIGS. 7 through 10.

At 1610 the UE 115 may search the search space for the location indicator transmission. The operations of 1610 may be performed according to the methods described herein. In certain examples, aspects of the operations of 1610 may be performed by a blind decode component as described with reference to FIGS. 7 through 10.

At 1615 the UE 115 may decode the location indicator transmission responsive to the searching. The operations of 1615 may be performed according to the methods described herein. In certain examples, aspects of the operations of 1615 may be performed by a blind decode component as described with reference to FIGS. 7 through 10.

At 1620 the UE 115 may monitor the downlink control channel resources based at least in part on the received location indicator. The operations of 1620 may be performed according to the methods described herein. In certain examples, aspects of the operations of 1620 may be performed by a decoding component as described with reference to FIGS. 7 through 10.

At 1625 the UE 115 may receive downlink control channel information on the downlink control channel resources based at least in part on the monitoring. The operations of 1625 may be performed according to the methods described herein. In certain examples, aspects of the operations of 1625 may be performed by a control channel resource manager as described with reference to FIGS. 7 through 10.

At 1630 the UE 115 may identify, based at least in part on the downlink control channel information, downlink shared channel resources that have been allocated for shared channel transmissions to the UE. The operations of 1630 may be performed according to the methods described herein. In certain examples, aspects of the operations of 1630 may be performed by a shared channel resource manager as described with reference to FIGS. 7 through 10.

At 1635 the UE 115 may receive the shared channel transmissions via the downlink shared channel resources. The operations of 1635 may be performed according to the methods described herein. In certain examples, aspects of the operations of 1635 may be performed by a receiver as described with reference to FIGS. 7 through 10.

Figure 17:
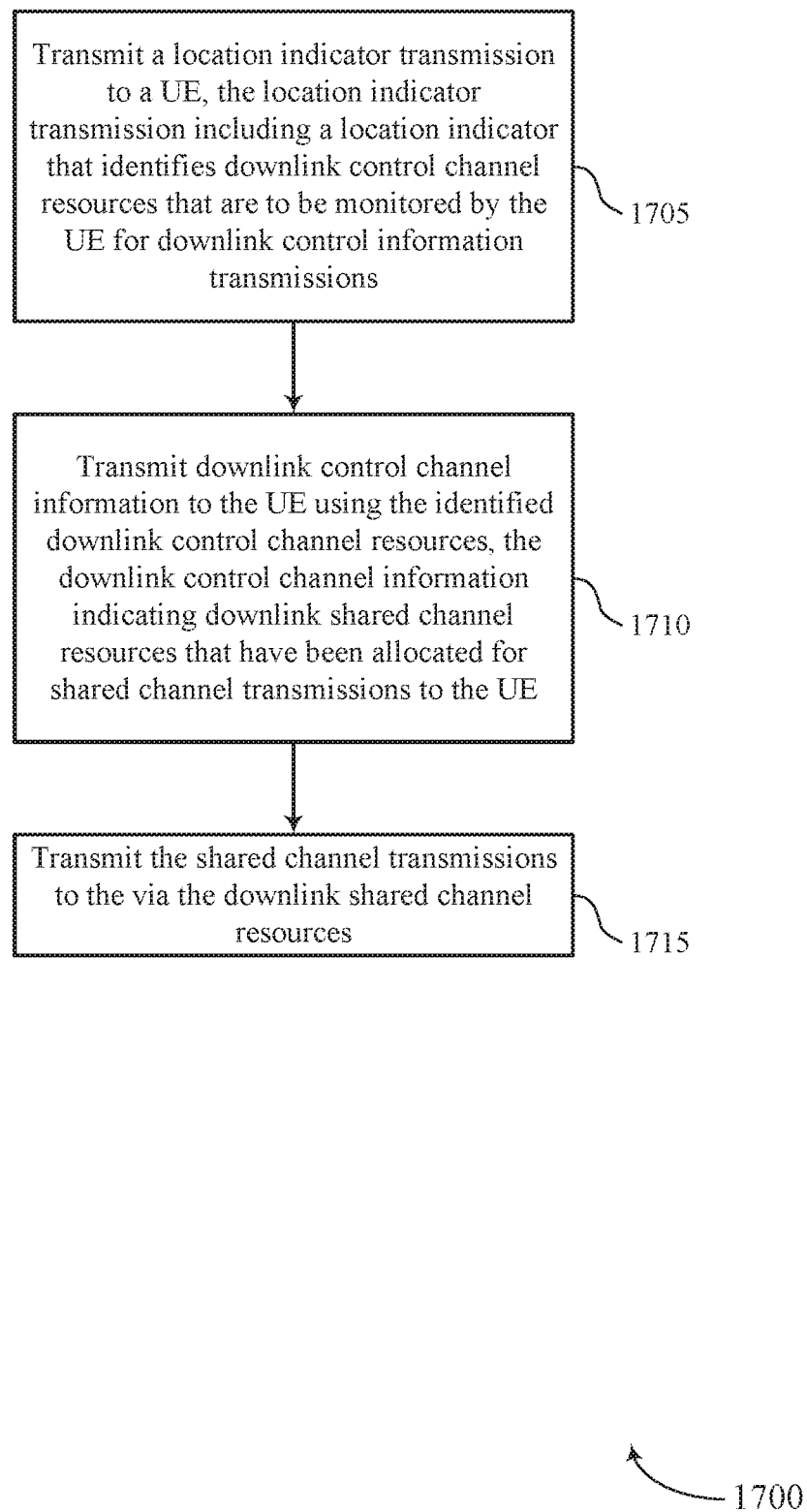

FIG. 17 shows a flowchart illustrating a method 1700 for techniques for downlink control channel location indication in wireless communications in accordance with aspects of the present disclosure. The operations of method 1700 may be implemented by a base station 105 or its components as described herein. For example, the operations of method 1700 may be performed by a base station communications manager as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At 1705 the base station 105 may transmit a location indicator transmission to a UE, the location indicator transmission including a location indicator that identifies downlink control channel resources that are to be monitored by the UE for downlink control information transmissions. The operations of 1705 may be performed according to the methods described herein. In certain examples, aspects of the operations of 1705 may be performed by a DCI manager as described with reference to FIGS. 11 through 14.

At 1710 the base station 105 may transmit downlink control channel information to the UE using the identified downlink control channel resources, the downlink control channel information indicating downlink shared channel resources that have been allocated for shared channel transmissions to the UE. The operations of 1710 may be performed according to the methods described herein. In certain examples, aspects of the operations of 1710 may be performed by a control channel resource manager as described with reference to FIGS. 11 through 14.

At 1715 the base station 105 may transmit the shared channel transmissions to the via the downlink shared channel resources. The operations of 1715 may be performed according to the methods described herein. In certain examples, aspects of the operations of 1715 may be performed by a shared channel resource manager as described with reference to FIGS. 11 through 14.

Figure 18:
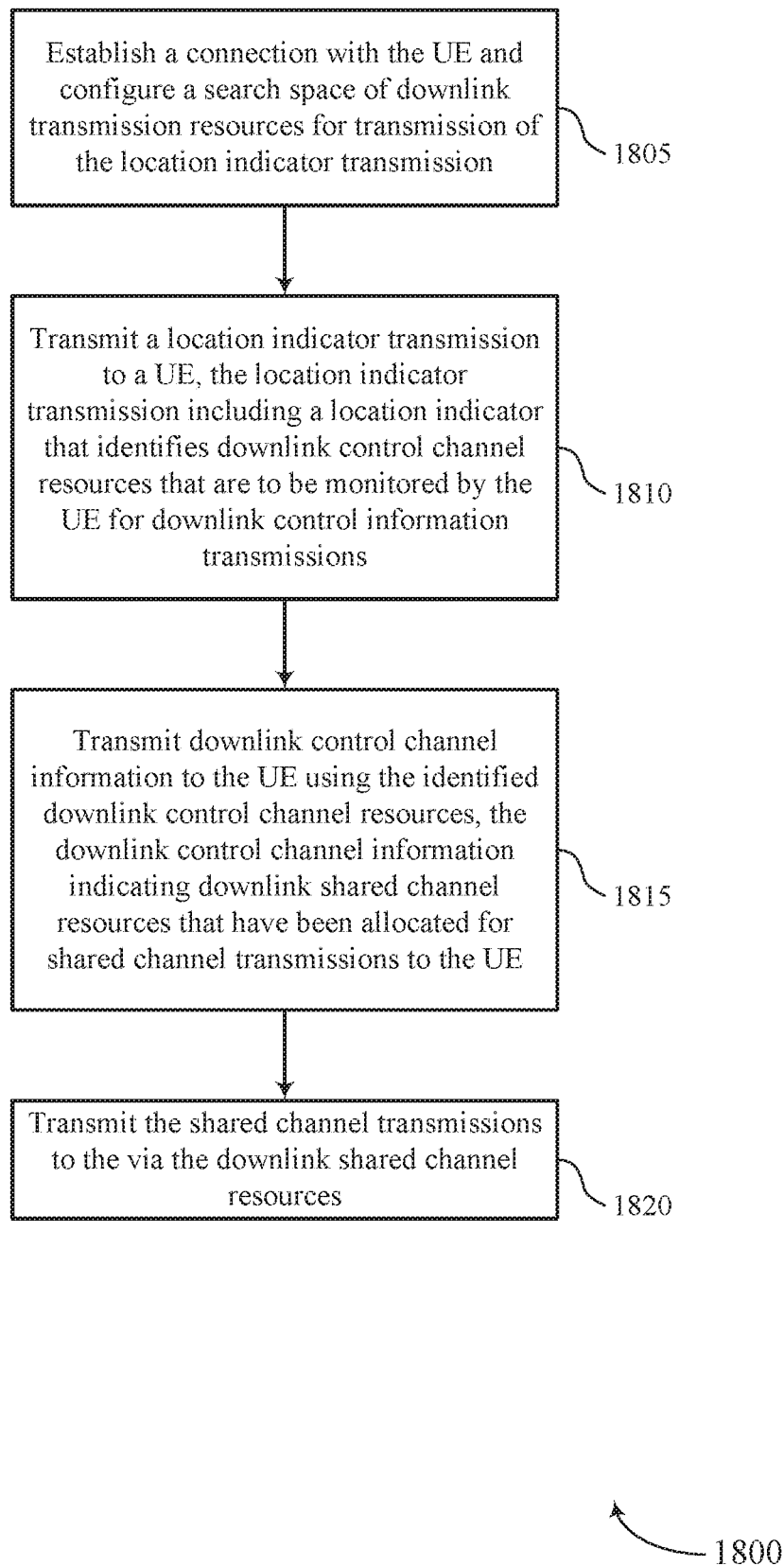

FIG. 18 shows a flowchart illustrating a method 1800 for techniques for downlink control channel location indication in wireless communications in accordance with aspects of the present disclosure. The operations of method 1800 may be implemented by a base station 105 or its components as described herein. For example, the operations of method 1800 may be performed by a base station communications manager as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At 1805 the base station 105 may establish a connection with the UE and configure a search space of downlink transmission resources for transmission of the location indicator transmission. The operations of 1805 may be performed according to the methods described herein. In certain examples, aspects of the operations of 1805 may be performed by a search space configuration component as described with reference to FIGS. 11 through 14.

At 1810 the base station 105 may transmit a location indicator transmission to a UE, the location indicator transmission including a location indicator that identifies downlink control channel resources that are to be monitored by the UE for downlink control information transmissions. The operations of 1810 may be performed according to the methods described herein. In certain examples, aspects of the operations of 1810 may be performed by a DCI manager as described with reference to FIGS. 11 through 14.

At 1815 the base station 105 may transmit downlink control channel information to the UE using the identified downlink control channel resources, the downlink control channel information indicating downlink shared channel resources that have been allocated for shared channel transmissions to the UE. The operations of 1815 may be performed according to the methods described herein. In certain examples, aspects of the operations of 1815 may be performed by a control channel resource manager as described with reference to FIGS. 11 through 14.

At 1820 the base station 105 may transmit the shared channel transmissions to the via the downlink shared channel resources. The operations of 1820 may be performed according to the methods described herein. In certain examples, aspects of the operations of 1820 may be performed by a shared channel resource manager as described with reference to FIGS. 11 through 14.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like).

An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
receiving, at a user equipment (UE), a location indicator transmission based at least in part on monitoring a set of resources specific to the location indicator transmission, the location indicator transmission having a location indicator that identifies downlink control channel resources that are to be monitored by the UE for downlink control information transmissions, wherein the receiving the location indicator transmission comprises identifying a search space of downlink transmission resources that are configured for transmission of the location indicator transmission, searching the search space for the location indicator transmission, and decoding the location indicator transmission responsive to the searching;
monitoring the downlink control channel resources based at least in part on the received location indicator;
receiving downlink control information on the downlink control channel resources based at least in part on the monitoring;
identifying, based at least in part on the downlink control information, downlink shared channel resources that have been allocated for shared channel transmissions to the UE; and
receiving the shared channel transmissions via the downlink shared channel resources.

2. The method of claim 1, wherein the receiving the location indicator transmission comprises receiving a physical location indicator channel (PLICH) transmission that includes the location indicator.

3. The method of claim 2, wherein the PLICH transmission and a first instance of the downlink control channel resources to be monitored are in a same radio frame.

4. The method of claim 2, wherein the location indicator includes one or more of a valid period for the location indicator, an interval at which the downlink control channel resources are to be monitored, an aggregation level of the downlink control information transmitted using the downlink control channel resources, an index of a first control channel element of the downlink control channel resources, or any combination thereof.

5. The method of claim 4, wherein the valid period corresponds to a number of radio frame intervals during which the UE is to monitor the identified downlink control channel resources, and wherein the UE monitors for a second PLICH transmission responsive to an expiration of the valid period.

6. The method of claim 1, wherein the search space includes a common search space for multiple UEs and a UE-specific search space.

7. The method of claim 1, wherein the searching comprises blindly decoding a plurality of decoding hypotheses within the search space.

8. The method of claim 1, wherein the shared channel transmissions are transmissions of a first service that has a lower latency than a second service, and wherein the search space corresponds to a subset of a control channel search space associated with the second service.

9. The method of claim 8, wherein the first service is an ultra-reliable low latency (URLLC) service and the second service is an enhanced mobile broadband (eMBB) service.

10. The method of claim 8, wherein a coding rate of the location indicator transmission is lower than a coding rate of control channel transmissions of the second service that are transmitted in the control channel search space associated with the second service.

11. A method for wireless communication, comprising:
establishing a connection with a user equipment (UE);
configuring a search space of downlink transmission resources for transmission of a location indicator transmission;

transmitting the location indicator transmission to the (UE) in a set of resources specific to the location indicator transmission, the location indicator transmission including a location indicator that identifies downlink control channel resources that are to be monitored by the UE for downlink control information transmissions;

transmitting downlink control information to the UE using the identified downlink control channel resources, the downlink control information indicating downlink shared channel resources that have been allocated for shared channel transmissions to the UE; and transmitting the shared channel transmissions to the UE via the downlink shared channel resources.

12. The method of claim 11, wherein the transmitting the location indicator transmission comprises transmitting a PLICH transmission that includes the location indicator.

13. The method of claim 12, wherein the PLICH transmission and a first instance of the downlink control channel resources that are to be monitored are in a same radio frame.

14. The method of claim 12, wherein the location indicator includes one or more of a valid period for the location indicator, an interval at which the downlink control channel resources are to be monitored by the UE, an aggregation level of the downlink control information transmitted using the downlink control channel resources, an index of a first control channel element of the downlink control channel resources, or any combination thereof.

15. The method of claim 14, wherein the valid period corresponds to a number of radio frame intervals during which the UE is to monitor the identified downlink control channel resources, and wherein the UE monitors for a second PLICH transmission responsive to an expiration of the valid period.

16. The method of claim 11, wherein the search space includes a common search space for multiple UEs and a UE-specific search space.

17. The method of claim 11, wherein the shared channel transmissions are transmissions of a first service that has a lower latency than a second service, and wherein the search space corresponds to a subset of a control channel search space associated with the second service.

18. The method of claim 17, wherein the first service is an URLLC service and the second service is an eMBB service.

19. The method of claim 17, wherein a coding rate of the location indicator transmission is lower than a coding rate of control channel transmissions of the second service that are transmitted in the control channel search space associated with the second service.

20. A user equipment (UE), comprising:
means for receiving, at the UE, a location indicator transmission based at least in part on monitoring a set of resources specific to the location indicator transmission, the location indicator transmission having a location indicator that identifies downlink control channel resources that are to be monitored by the UE for downlink control information transmissions, wherein the means for receiving the location indicator transmission comprise means for identifying a search space of downlink transmission resources that are configured for transmission of the location indicator transmission, means for searching the search space for the location indicator transmission, and means for decoding the location indicator transmission responsive to the searching;

means for monitoring the downlink control channel resources based at least in part on the received location indicator;

means for receiving downlink control information on the downlink control channel resources based at least in part on the monitoring;

means for identifying, based at least in part on the downlink control information, downlink shared channel resources that have been allocated for shared channel transmissions to the UE; and means for receiving the shared channel transmissions via the downlink shared channel resources.

21. The UE of claim 20, wherein the means for receiving the location indicator transmission receives a physical location indicator channel (PLICH) transmission that includes the location indicator.

22. The UE of claim 21, wherein the PLICH transmission and a first instance of the downlink control channel resources to be monitored are in a same radio frame.

23. The UE of claim 21, wherein the location indicator includes one or more of a valid period for the location indicator, an interval at which the downlink control channel resources are to be monitored, an aggregation level of the downlink control information transmitted using the downlink control channel resources, an index of a first control channel element of the downlink control channel resources, or any combination thereof.

24. The UE of claim 23, wherein the valid period corresponds to a number of radio frame intervals during which the UE is to monitor the identified downlink control channel resources, and wherein the UE monitors for a second PLICH transmission responsive to an expiration of the valid period.

25. A network entity, comprising:
means for establishing a connection with a user equipment (UE);

means for configuring a search space of downlink transmission resources for transmission of a location indicator transmission;

means for transmitting the location indicator transmission to the UE in a set of resources specific to the location indicator transmission, the location indicator transmission including a location indicator that identifies downlink control channel resources that are to be monitored by the UE for downlink control information transmissions;

means for transmitting downlink control information to the UE using the identified downlink control channel resources, the downlink control information indicating downlink shared channel resources that have been allocated for shared channel transmissions to the UE; and means for transmitting the shared channel transmissions to the UE via the downlink shared channel resources.

26. The network entity of claim 25, wherein the means for transmitting the location indicator transmission transmits a PLICH transmission that includes the location indicator.

27. The network entity of claim 26, wherein the PLICH transmission and a first instance of the downlink control channel resources that are to be monitored are in a same radio frame.

28. The network entity of claim 26, wherein the location indicator includes one or more of a valid period for the location indicator, an interval at which the downlink control channel resources are to be monitored by the UE, an aggregation level of the downlink control information transmitted using the downlink control channel resources, an index of a first control channel element of the downlink control channel resources, or any combination thereof.

* * * * *